United States Patent [19]
Mitsuno et al.

[11] Patent Number: 5,081,186
[45] Date of Patent: Jan. 14, 1992

[54] THERMOPLASTIC OLEFIN RESIN COMPOSITION

[75] Inventors: Tatsuyuki Mitsuno, Chiba; Teruhisa Koyama, Niihama; Takeshi Fujii, Chiba; Masashi Yamamoto, Ichihara, all of Japan

[73] Assignee: Sumitomo Chemical Company, Limited, Osaka, Japan

[21] Appl. No.: 431,177

[22] Filed: Nov. 3, 1989

[30] Foreign Application Priority Data

Nov. 11, 1988 [JP] Japan ................................ 63-286364
Nov. 11, 1988 [JP] Japan ................................ 63-286365

[51] Int. Cl.$^5$ .................... C08L 23/10; C08L 79/08; C08L 51/06
[52] U.S. Cl. .......................................... 525/71; 525/74
[58] Field of Search ................... 525/66, 71, 73, 74

[56] References Cited

U.S. PATENT DOCUMENTS 4,595,727 6/1986 Doak ....................................... 525/71
4,780,505 10/1988 Mashita ................................. 525/66

FOREIGN PATENT DOCUMENTS 084855 5/1983 Japan ..................................... 525/74

OTHER PUBLICATIONS

Derwent Abstracts of Japanese Patent Applications 62-096551 and 60-202139.
Patent Abstracts of Japan, vol. 12, No. 82 (C-481)(2929) 15 Mar. 1988.
Patent Abstracts of Japan, vol. 10, No. 63 (C-332)(2120, 13 Mar. 1986.

*Primary Examiner*—John C. Bleutge
*Assistant Examiner*—David Buttner
*Attorney, Agent, or Firm*—Stevens, Davis, Miller & Mosher

[57] ABSTRACT

The thermoplastic olefin resin composition of the present invention comprises: a resin composition consisting of at least one modified polypropylene and a polyglutarimide, and an epoxy group containing copolymer. The modified polypropylene is one in which at least an unsaturated carboxylic acid or a derivative thereof is graft copolymerized onto a polypropylene. This composition has good mold processability and can be used to produce molded products which are superior in mechanical properties to those obtained from the individual polymers of the composition.

34 Claims, 1 Drawing Sheet

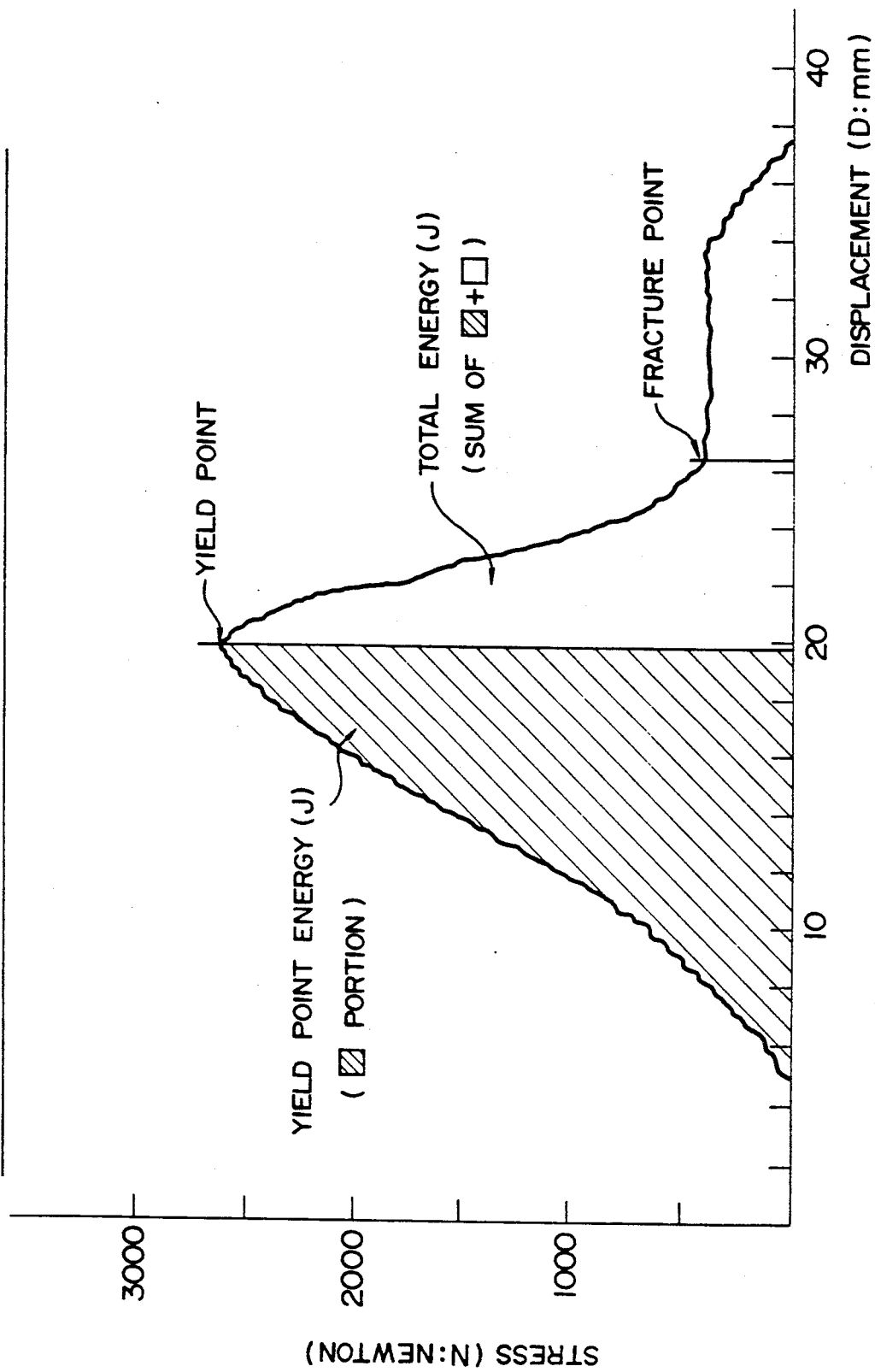
FIG. 1 MEASUREMENT OF PENETRATION IMPACT STRENGTH

THERMOPLASTIC OLEFIN RESIN COMPOSITION

The present invention relates to a novel thermoplastic resin composition which can be utilized in the form of molded articles, sheets, films, etc. by means of injection molding, extrusion molding, etc.

More particularly, the present invention relates to a novel thermoplastic resin composition comprising a polypropylene resin, a polyglutarimide resin and an epoxy group containing copolymer, which composition gives molded products having an excellent balance in physical properties and a beautiful appearance.

DESCRIPTION OF THE FIGURE

FIG. 1 shows an example of measurement chart in evaluating the penetration impact strength. The axis of abscissa refers to displacement (D: mm) indicating the deformation of a test piece and the axis of ordinate to stress (N: newton) corresponding to individual values of the displacement.

The yield point is a point at which the stress corresponding to individual values of the displacement which increases up to this point begins to decrease. The fracture point is a point at which a material is fractured and the change of stress is stopped.

The yield point energy is determined by integrating the area with respect to the displacement and the stress from the rising of detected stress to the point of yield of a material. The total energy is determined by integrating the area with respect to the displacement and the stress from the rising of detected stress to the fracture point of the material.

Polypropylene have heretofore been widely used in the form of molded articles, films, sheets, etc. because they are advantageous in molding processability, toughness, water resistance, gasoline resistance, chemical resistance, etc. and a low specific gravity as well as a cost merit.

They, however, are disadvantageous in hear resistance, stiffness, impact resistance, scratch resistance, coating properties, adhesive properties, printability, etc. and should be improved in these properties. These disadvantages make an obstacle to opening-up of new avenues of practical use for them.

For improving the coating properties, adhesive properties, printability, etc. among the above properties has been deviced a method which comprises subjecting a portion or the whole of a polypropylene to graft modification by the use of an unsaturated carboxylic acid or an anhydride thereof (e.g. maleic anhydride) as disclosed in JP-B-58-47418 or JP-A-58-49736, for example. However, even the employment of the modified polypropylenes thus obtained does not virtually improve physical properties such as impact resistance, heat resistance and stiffness.

On the other hand, polyglutarimides are thermoplastic resins excellent in heat resistance, but their use as molding materials is considerably limited because they are poor in mechanical strength a typical example of which is impact resistance.

From such a viewpoint, if the blending of a polypropylene type resin selected from modified polypropylenes and compositions composed of a modified polypropylene and a polypropylene, with a polyglutarimide gave a thermoplastic resin having the advantages that the polypropylene resin and the polyglutarimide have, the resulting thermoplastic resin would be expected to have various new uses.

However, it has heretofore been known that the compatibility and dispersability between polypropylene resins and polyglutarimides are very low. In fact, the mere mixing of the above two resins involves the following problems.

(1) Barus effect of molten polymer is remarkable, so that stable taking-off of extruded strand is substantially impossible, resulting in a marked lowering of the molding workability.

(2) There can be obtained only an injection-molded product which has an extreme nonuniformity, has an ugly appearance owing to formation of flow marks, and cannot be used in practice in automobile parts, electric and electronic parts, etc.

(3) The mechanical properties, in particular, impact resistance, tensile elongation, etc., of a molded product made of a mixture of a polypropylene resin and a polyglutarimide often have values lower than those usually expected from the additivity of the respective physical properties of the polypropylene resin and the polyglutarimide.

In the fields of automobile parts, electric and electronic parts, etc., there is a demand for high heat resistance and high impact resistance. Therefore, in order to develop a material having such properties, the present inventors earnestly investigated and consequently accomplished the present invention.

According to the present invention, there are provided a thermoplastic propylene resin composition comprising 100 parts by weight of a resin composition (Component F) consisting of 1 to 99% by weight of Component D which is at least one member selected from the group consisting of a modified polypropylene in which an unsaturated carboxylic acid or a derivative thereof is graft copolymerized onto a polypropylene (Component A), a modified polypropylene in which an unsaturated carboxylic acid or a derivative thereof and an unsaturated aromatic monomer are graft copolymerized onto a polypropylene (Component B), a mixture of Component A and a polypropylene (Component C), a mixture of Component B and a polypropylene (Component C), and 99 to 1% by weight of a polyglutarimide (Component E), and 0.1 to 300 parts by weight of an epoxy group containing copolymer (Component G);

a thermoplastic olefin resin composition comprising 100 parts by weight of a resin composition (Component F') consisting of 1 to 99% by weight of Component D' which is at least one member selectred from the group consisting of a modified polypropylene composition in which an unsaturated carboxylic acid or a derivative thereof is graft copolymerized onto a mixture of Component C and a rubber-like material (Component H) (Component A'), a modified polypropylene composition in which an unsaturated carboxylic acid or a derivative thereof and an unsaturated aromatic monomer are graft copolymerized onto a mixture of Component C and a rubber-like material (Component H) (Component B'), a mixture of Component A' and a polypropylene (Component C), a mixture of Component B' and a polypropylene (Component C), and 99 to 1% by weight of a polyglutarimide (Component E), and 0.1 to 300 parts by weight of an epoxy group containing copolymer (Component G): and a thermoplastic olefin resin composition comprising 100 parts by weight of a resin composition (Component F) consisting of 1 to 99% by weight of Component D which is at least one member selectred from the group consisting of a modified polypropylene in which an unsaturated carboxylic acid or a derivative thereof is graft copolymerized onto a polypropylene (Component A), a modified polypropylene in which an unsaturated carboxylic acid or a derivative thereof and an unsaturated aromatic monomer are graft copolymerized onto a polypropylene (Component B), a mixture of Component A and a polypropylene (Component C), a mixture of Component B and a polypropylene (Component C), and 99 to 1% by weight of a polyglutarimide (Component E), 0.1 to 300 parts by weight of an epoxy group containing copolymer (Component G), and 0.1 to 300 parts by weight of a rubber-like material (Component H) and/or a modified rubber-like material (Component I) in which one compound or combination of compounds selected from the group consisting of an unsaturated carboxylic acid, a derivative of an unsaturated carboxylic acid, an unsaturated carboxylic acid and an unsaturated aromatic monomer, and a derivative of unsaturated carboxylic acid and an unsaturated aromatic monomer, is graft copolymerized onto a rubber-like material.

A detailed explanation of polypropylene is given below. In the present specification, the term "polypropylene" is used as a starting material for the modified polypropylenes (Components A and B) and the modified polypropylene compositions (Components A' and B') in some cases and as the polypropylene (Component C) in other cases.

The polypropylene used in the present invention is a crystalline polypropylene. It includes propylene homopolymer; block copolymers obtained by polymerizing propylene at the first step and copolymerizing the resulting polypropylene with ethylene and at least one α-olefin such as propylene or butene-1 at the second step; and random copolymers obtained by copolymerizing propylene with an α-olefin such as ethylene or butene-1.

The homopolymers, block copolymers or random copolymers can be obtained, for example, by reacting the starting materials in the presence of a chemical complex of a titanium trichloride and an alkylaluminum compound which is usually called Ziegler-Natta catalyst.

The polymerization can be carried out at 0° C. to 300° C. However, preferably, the polymerization is carried out usually in the range of 0° to 100° C., for example, because above 100° C., it becomes difficult for highly stereoregular polymerization of an α-olefin such as propylene to yield a polymer having a high stereoregularity.

Although the polymerization pressure is not critical, it is preferably 3 to 100 atmospheres because such a pressure is industrially practical and economically beneficial.

The polymerization can be carried out by a continuous process or a batch process.

As a method for the polymerization, there can be employed slurry polymerization using an inert hydrocarbon solvent such as butane, pentane, hexane, heptane, or octane; solution polymerization in which the produced polymer is dissolved in the inert hydrocarbon solvent mentioned above; bulk polymerization in which a liquid monomer is polymerized without a solvent; and gas phase polymerization in which a gaseous monomer is polymerized.

It is also possible to add a chain transfer agent such as hydrogen in order to control the molecular weight of polymer.

The polypropylene used in this invention can be produced using an isospecific Ziegler-Natta catalyst. The catalyst used herein is preferably one which has a high isospecificity.

Catalysts which can be suitably used are those containing titanium trichloride having a layer crystal structure or a solid complex of a magnesium compound and a titanium compound as the transition metal constituent and an organoaluminum compound as the typical metal constituent. The catalyst may further contain a well-known electron donative compound as the third component.

Titanium trichloride used can be prepared by reducing titanium tetrachloride with a reducing agent of wide variety. As the reducing agent, metals such as aluminum and titanium, hydrogen, organometal compounds, etc. are known. A typical example of titanium trichloride produced through metal reduction is titanium trichloride composition ($TiCl_3AA$) which is prepared by reducing titanium tetrachloride with metallic aluminum and then pulverizing the reduction product by means of a ball mill or a vibration mill. Owing to the above process, the $TiCl_3AA$ contains activated aluminum chlorides. For improving the isospecificity, polymerization activity and/or particle shape of the $TiCl_3AA$, a compound selected from the group consisting of ethers, ketones, esters, aluminum chloride, titanium tetrachloride, etc. may be added during the pulverization.

Titanium trichloride more preferable for the object of this invention is one which is obtained by reducing titanium tetrachloride with an organoaluminum compound, and subjecting the resulting titanium trichloride composition to catalytic reaction with an ether compound and a halogen compound successively or at the same time. As the ether compound, those having the formula $R^1-O-R^2$ (each of $R^1$ and $R^2$ is an alkyl group having 1 to 18 carbon atoms), in particular, di-n-butyl ether and di-t-amyl ether, are preferable. The halogen compound is preferably selected from the group consisting of halogens, in particular, iodine; halogen compounds, in particular, iodine trichloride; titanium halides, in particular, titanium tetrachloride; and halogenated hydrocarbons, in particular, carbon tetrachloride and 1,2-dichloroethane. As the organoaluminum compound, those represented by the formula $AlR^3{}_NX_{3-n}$ ($R^3$ is a hydrocarbon group having 1 to 18 carbon atoms, X is a halogen selected from Cl, Br and 1, and n is an integer satisfying the inequality of $3 \geq n > 1$), in particular, diethylamuminum chloride and ethylaluminum sesquichloride, are preferable.

Processes for producing such titanium trichloride as mentioned above are disclosed in detail in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a layer crystal structure is used as the transition metal compound component, organoaluminum compounds represented by the formula $AlR^4_m X_{3-m}$ ($R^4$ is a hydrocarbon group having 1 to 18 carbon atoms, X is a halogen selected from Cl, Br and I, and m is a number in the range $3 \geq m > 0$) are preferable as the typical metal compound component. Organoaluminum compounds particularly preferable for the object of this invention are compounds in which $R^4$ is an ethyl or isobutyl group, and m is a number in the range $2.5 \geq m \geq 1.5$. Specific examples of such compounds are diethylaluminum chloride, diethylaluminum bromide, diethylaluminum iodide, and mixtures of these compounds and triethylaluminum or ethylaluminum chloride. When the third component described later is co-used, organoaluminum compounds in which m is a number in the range $3 \geq m \geq 2.5$ or $1.5 \geq m > 0$ can be suitably used for the object of this invention.

The molar ratio of the organoaluminum compound to the titanium trichloride falls within a wide range of 1–1,000:1.

The catalyst comprising titanium trichloride and the organoaluminum compound may further contain the third component which is well known. Specific examples of the third component are $\epsilon$-caprolactam; ester compounds such as methyl methacrylate, ethyl benzoate, methyl toluate, and the like; phosphorus acid esters such as triphenyl phosphite, tributyl phosphite, and the like; and phosphoric acid derivatives such as hexamethylphosphoric triamide, and the like.

Although the amount used of the third component should be experimentally determined for each component because the components exhibit different efficiencies, it is usually used in an amount equimolar with or smaller than the amount of the organoaluminum compound.

When a solid complex of a magnesium compound and a titanium compound is used as the transition metal solid component of the catalyst, organoaluminum compounds, in particular, compounds represented by the formula $AlR^5_p X$ ($R^5$ is a hydrocarbon group having 1 to 18 carbon atoms, X is a halogen selected from Cl, Br and I, and p is a number in the range $3 \geq p > 2$), are preferable as the typical metal component of the catalyst. Specific examples of such compounds are triethylaluminum, triisobutylaluminum, and mixtures of these compounds with diethylaluminum chloride or diisobutylaluminum chloride.

It is preferable that the catalyst further contains at least one electron-donating compound, in particular, an aromatic monocarboxylic acid ester and/or a silicon compound having Si—$OR^6$ linkage.

As the silicon compound having Si—$OR^6$ linkage ($R^6$ is a hydrocarbon group having 1 to 20 carbon atoms), preferably used are alkoxysilane compounds represented by the formula $R^7_a Si(OR^6)_{4-a}$ (each of $R^6$ and $R^7$ is a hydrocarbon group having 1 to 20 carbon atoms, and a is a number of $0 \leq a \leq 3$). Specific examples of the alkoxysilane compounds are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The electron-donating compound is used preferably in an amount of 1 mole or less, particularly 0.05 to 1 mole per mole of the organoaluminum compound.

As the solid complex of a magnesium compound and a titanium compound, there is used titanium trichloride containing magnesium chlorides which is obtained by reducing titanium tetrachloride with an organomagnesium compound, or one of the so-called "supported catalyst" prepared by subjecting a solid magnesium compound to catalytic reaction with a liquid titanium compound. Preferably, the solid magnesium compound is a compound containing at least one electron-donating compound, in particular, an aromatic monocarboxylic acid ester, an aromatic dicarboxylic acid diester, an ether compound, an alcohol and/or a phenol. The aromatic monocarboxylic acid ester can be added during the catalytic reaction with a titanium compound.

Such solid complexes of a magnesium compound and a titanium compound are described in many official patent gazettes. Catalysts suitable for the object of this invention are described in detail, for example, in JP-A-54112988, JP-A-54-119586, JP-A-56-30407, JP-A-57-59909, JP-A-57-59910, JP-A-59911, JP-A-59912, JP-A-57-59914, JP-A-57-59915, JP-A-57-59916, JP-A-54-112982, JP-A-55-133408, JP-A-5827704, etc.

When the thermoplastic olefin resin composition of the present invention encounters such requirements as particularly high heat resistance, stiffness, scratch resistance, etc., it is preferable to use a highly crystalline polypropylene having the following properties: an isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step of the block polymerization process; a boiling heptane soluble of not more than 5.0% by weight; a 20° C. xylene soluble of not more than 2.0% by weight.

The isotactic pentad of boiling heptane insoluble, boiling heptane soluble and 20° C. xylene soluble are determined as follows.

In 500 ml of boiling xylene is completely dissolved 5 g of polypropylene, and the resulting mixture is cooled to 20° C. and allowed to stand for 4 hours. Then, the mixture is filtered to remove the 20° C. xylene insoluble. The filtrate is concentrated to dryness to evaporate xylene, and the residue is further dried under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent The above 20° C. xylene insoluble is dried and then extracted with boiling n-heptane in a Soxlet apparatus for 8 hours. The extraction residue is referred to as boiling heptane insoluble. The boiling heptane soluble is determined by subtracting the dry weight of the boiling heptane insoluble from the weight of the sample used (5 g) and dividing the remainder by the weight of the sample used. It is also represented by percent.

Isotactic pentad refers to the fraction of a series of five successive isotactically-sequenced propylene monomer units in the total polymer chain. It is determined based on 13C-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 polypropylene PP/MWD/2 provided by the National Physical Laboratory (United Kingdom) gave an isotactic pentad of 0.944.

The above-mentioned highly crystalline polypropylene can be prepared by any of the methods disclosed in JP-A-60-28405, JP-A-60-228504, JP-A-61-218606, JP-A-61-287917, etc.

When the thermoplastic olefin resin composition of the present invention is used for a purpose wherein an impact resistance is required, it is preferable to use a propylene block copolymer, which contains propylene homopolymer portions prepared in the first step as the first segment and block copolymer portions of propylene and an α-olefin such as ethylene and butene-1 prepared in the second step of the block polymerization process as the second segment.

The propylene block copolymer can be prepared by slurry polymerization or gas phase polymerization. When said thermoplastic olefin resin composition is used for a purpose wherein a particularly high impact resistance is required, the amount of the second segment should be increased. In this case, the propylene block copolymer is prepared preferably by gas phase polymerization.

Such a polypropylene having a high impact resistance can be prepared, for example, by the gas phase polymerization disclosed in JP-A-61-287917.

In the propylene block copolymer, the propylene homopolymer portion prepared in the first step of the polymerization may consist of propylene monomer units alone or may consist of propylene monomer units and α-olefin monomer units such as ethylene or an α-olefin having 4 to 6 carbon atoms, wherein the content of the α-olefin monomer units is 6 mole % or less based on the total moles of the monomer units in the polymer produced in the first step. The copolymer portion prepared as the second segment in the second step of the polymerization preferably consists of ethylene monomer units only or consists of propylene monomer units and ethylene monomer units wherein the content of the ethylene monomer units is 10 mole % or more based on the total moles of the monomer units in the polymer produced in the second step or consists of monomer units of propylene, ethylene, and an α-olefin having 4 to 6 carbon atoms. The propylene block copolymer contains the polymer produced in the second step, in an amount of 10 to 70% by weight based on the weight of the propylene block copolymer.

The content of the second segment for easy and stable production ranges from 10 to 30% by weight for slurry polymerization and from 10 to 70% by weight for gas phase polymerization.

In gas phase polymerization, propylene block copolymers containing a large amount of the second segment can be prepared according to the process disclosed in Japanese Patent Application No. 62-256015. Such copolymers are suited for the use wherein an extremely high impact resistance is requested.

Although the intrinsic viscosity of the second segment in tetralin at 135° C. should be changed depending on the production efficiency, physical properties of the product powder, and the intrinsic viscosity of the first segment, it is approximately 3-8 dl/g for slurry polymerization and 1-5 dl/g for gas phase polymerization.

In the present invention, the modified polypropylene (Component A or B) and the modified polypropylene compositions (Component A' or B') can be obtained, for example, by graft copolymerizing an unsaturated carboxylic acid or a derivative thereof or a combination of an unsaturated carboxylic acid or derivative thereof and an unsaturated aromatic monomer onto a polypropylene, if necessary, in the presence of a free-radical initiator.

For grafting the graft monomer on a polypropylene, various conventional methods can be employed.

There can be employed, for example, a method comprising mixing polypropylene, graft monomer and a radical-generating agent followed by melt-kneading the resulting mixture in a melt-kneading apparatus to graft the graft monomer; a method comprising dissolving polypropylene in an organic solvent such as xylene, adding thereto a radical-generating agent in nitrogen atmosphere, carrying out the reaction with heating and stirring, thereafter cooling the reaction mixture, followed by washing, filtration and drying, and thereby obtaining a graft polypropylene; a method comprising irradiating polypropylene with ultraviolet light or radiation in the presence of graft monomer; and a method comprising bringing polypropylene into contact with oxygen or ozone in the presence of graft monomer.

In view of cost factor and the like, it is most preferable to employ the method comprising melt-kneading in a melt-kneading apparatus and thereby carrying out graft copolymerization.

A polypropylene can be melt-kneaded with a mixture of an unsaturated carboxylic acid or a derivative thereof and if necessary, a free-radical initiator, or with a mixture of an unsaturated carboxylic acid or a derivative thereof, an unsaturated aromatic monomer and if necessary, a free-radical initiator, at a temperature of 150° to 300° C., preferably 190° to 280° C. for a residence time of 0.3 to 10 minutes, preferably 0.5 to 5 minutes with an extruder, Banbury mixer, kneader, etc. It is industrially advantageous to employ a method in which a modified polypropylene or a modified polypropylene composition is continuously produced by a single- or twin-screw extruder while keeping the vent holes vacuous and while removing unreacted components (unsaturated carboxylic acid or derivative thereof, free-radical initiator, etc.), and by-products such as oligomers and decomposition products of these components. although the reaction may be carried out in air, it is preferably carried out in an inert gas such as nitrogen or carbon dioxide. It is also possible to subject the modified polypropylene obtained or the modified polypropylene composition to heat treatment at a temperature of 60° C. or higher, solvent extraction, and drawing a vacuum with melting in order to further remove a trace amount of the unreacted components and the by-products contained in the modified polypropylene or the modified polypropylene composition.

If necessary, to the modified polypropylenes (Components A and B) and the modified polypropylene composition (Components A' and B') can be added antioxidants, heat stabilizers, light stabilizers, nucleating agents, lubricants, antistatic agents, inorganic or organic colorants, rust preventives, crosslinking agents, foaming agents, plasticizers, fluorescent agents, surface treating agents, surface brighteners, etc. during the modification or the after-treatment.

Specific examples of the unsaturated carboxylic acid used for the modification of a polypropylene or a mixture of a polypropylene and a rubber-like material are acrylic acid, methacrylic acid, maleic acid, itaconic acid, citraconic acid, bicyclo[2,2,1]-hepta-5-ene-2,3-dicarboxylic acid (himic acid), bicyclo[2,2,2]octa-5-ene-2,3-dicarboxylic acid, 4-methylcyclohexa-4-ene-1,2-dicarboxylic acid, 1,2,3,4,5,8,9,10-octahydronaphthalen-2,3-dicarboxylic acid, bicyclo[2,2,1]octa-7-ene-2,3,5,6-tetracarboxylic acid, 7-oxabicyclo[2,2,1]hepta-5-ene-2,3-dicarboxylic acid and the like. The derivatives thereof are acid anhydrides, esters, amides, imides, metal salts, etc. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, monomethyl fumarate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutyl amide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

Of these, maleic anhydride is most preferable.

As the unsaturated aromatic monomer, styrene is most preferable. However, there can also be used o-methylstyrene, p-methylstyrene, m-methylstyrene, α-methylstyrene, vinyltoluene, vinylbenzene and mixtures thereof.

Although the modification can be carried out in the absence of a free-radical initiator, it is usually preferably carried out in the presence of a free-radical initiator. As the free-radical initiator, well-known ones can be used. Specific examples of the free-radical initiator are azo compounds such as 2,2'-azobisisobutyronitrile, 2,2'-azobis(2,4,4-trimethylvaleronitrile), etc.; organic peroxides such as methyl ethyl ketone peroxide, cyclonhexanone peroxide, 3,5,5-trimethylcyclohexanone peroxide, 2,2-bis(t-butylperoxy)butane, t-butyl hydroperoxide, cumen hydroperoxide, diisopropylbenzene hydroperoxide, 2,5-dimethylhexane- 2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di[t-butylperoxy)-hexyne-3, lauroyl peroxide, 3,3,5 trimethylhexanoyl peroxide, benzoyl peroxide, t-butyl peracetate, t-butylperoxyisobutyrate, t-butylperoxypivalate, t-butylperoxy-2-ethylhexanoate, t-butlperoxy-3,5,5trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

In the modification, although the melt flow rate of a starting polypropylene (a crystalline propylene homopolymer, a crystalline propylene-ethylene/α-olefin block copolymer, or a crystalline propylene-α-olefin random copolymer) is not critical, it is 0.05-60 g/10 min, preferably 0.1-40 g/10 min. The starting propylene is preferably chosen so as to adjust the melt flow rate of the resulting modified polypropylene (Components A and B) to 0.1-100 g/10 min, preferably 0.5-70 g/10 min. The number average molecular weight of the starting polypropylene is 7,000 to 800,000, preferably 10,000 to 700,000.

In the modification, the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the starting polypropylene. The amount of the free-radical initiator is preferably 0 to 5 parts by weight, more preferably 0.001 to 2 parts by weight per 100 parts by weight of the starting polypropylene. When the blending amount of the unsaturated carboxylic acid or derivative thereof is less than 0.01 part by weight, it tends to be difficult to obtain a marked improvement on the quality of the product. When it exceeds 10 parts by weight, the improvement sometimes hits the ceiling and no more remarkable effect is brought about in some cases. Moreover, the unsaturated carboxylic acid or derivative thereof tends to remain unreacted in a large amount in the resulting polymer and as a result, offensive smell, deterioration of physical properties, etc. tend to occur. Therefore, both of such amounts are not preferable for practical purposes in some cases. When the blending amount of the free-radical initiator exceeds 5 parts by weight, the rate of the graft reaction of the unsaturated carboxylic acid or derivative thereof is not accelerated any more in some cases. Moreover, the decomposition of the polypropylene sometimes becomes so serious that the fluidity (melt flow rate) tends to change greatly. Therefore, such an amount is not preferable for practical purposes in some cases.

In this invention, the melt flow rate of the modified polypropylene resin (Component D) is preferably 0.1–100 g/10 min, more preferably 0.5–40 g/10 min.

The polyglutarimide (Component E) contains cyclic imide structural units of the formula (1) shown below owing to conversion to imide in an amount of preferably at least 5% by weight, more preferably 20% by weight or more in the molecule.

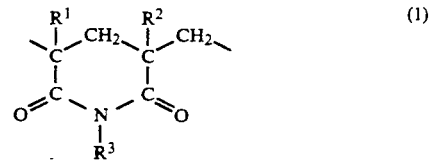
(1)

When the content of the cyclic imide structural units is too low, it is difficult in some cases to obtain a resin excellent in heat resistance. Although the weight average molecular weight of the polyglutarimide (Component E) is not critical, it is usually 40,000 to 400,000, preferably 40,000 to 200,000. When it is less than 40,000, the mechanical strength is not sufficient in some cases. When it exceeds 400,000, the molding processability is not sufficient in some cases.

Although a method for producing the polyglutarimide (Component E) is not critical, it can be produced by reacting at least one agent for conversion to imide selected from the group consisting of ammonia, primary amines and primary-amine-generating agents with a starting methacrylic resin with heating. The agent for conversion to imide is a compound represented by the formula $R^3NH_2$ ($R^3$ is a hydrogen atom or an aliphatic, aromatic or alicyclic hydrocarbon group having 1 to 20 carbon atoms). Specific examples of said compound are ammonia, methylamine, ethylamine, butylamine, hexylamine, octylamine, nonylamine, decylamine, allylamine, benzylamine, cyclohexylamine, aniline, halogenated aniline, urea, dimethylurea, and the like.

Of these, methylamine is the most preferable.

Examples of fundamental reaction are those disclosed in U.S. Pat. No. 2146209 and West German Patent Nos. 1077872 and 1242369 in which an imide is formed by reacting ammonia, butylamine, dodecylamine or octylamine with a methacrylic resin.

A preferable example of production method is a method comprising reacting a methacrylic ester polymer with ammonia or a primary amine in an extruder at a temperature of approximately 200°-450° C., as disclosed in JP-B-60-38404. According to this method, the resulting polymer is a polyglutarimide having no cross-linkage and a high uniformity.

There can be used a polymer obtained by reacting, as disclosed in JP-A-62-89705, an alkylating agent such as orthoester, ketal, carbonate, sulfoxide or the like for partial or complete removal of groups of acid and acid anhydride which remain in the polyglutarimide obtained according to JP-B-60-38404.

It is also possible to obtain a polyglutarimide by reacting the above agent for conversion to imide with a solution of a starting methacrylic resin in a solvent, and then removing the solvent.

The starting methacrylic resin used for producing the polyglutarimide (Component E) includes, for example, methacrylic ester homopolymers and copolymers of methacrylic esters and other methacrylic esters, acrylic esters, acrylic acid, methacrylic acid, styrene, α-methylstyrene, vinyltoluene, chlorostyrene or the like.

As the methacrylic esters, there can be used, for example, methyl methacrylate, ethyl methacrylate, propyl methacrylate, n-butyl methacrylate, isobutyl methacrylate, tert-butyl methacrylate, dodecyl methacrylate, cyclohexyl methacrylate, norbornyl methacrylate, 2-ethylhexyl methacrylate, and benzyl methacrylate. As the acrylic esters, there can be used, for example, methyl acrylate, ethyl acrylate, propyl acrylate, n-butyl acrylate, isobutyl acrylate, tertbutyl acrylate, dodecyl acrylate, cyclohexyl acrylate, norbornyl acrylate, 2-ethylhexyl acrylate, and benzyl acrylate. These monomers can be used alone or in combination of two or more thereof.

Among such methacrylic resins as described above, methyl methacrylate homopolymers or copolymers of 5% by weight or more of methyl methacrylate and less than 95% by weight of the other monomers exemplified above are preferable in the present invention.

The epoxy group containing copolymer (Component G) in the present invention is a copolymer obtained from an unsaturated epoxy compound and an ethylenic unsaturated compound.

Although the proportions of these compounds for the epoxy group containing copolymer (Component G) is not critical, the proportion of the unsaturated epoxy compound is preferably 0.1 to 50% by weight, more preferably 1 to 30% by weight, most preferably 10 to 25% by weight.

The unsaturated epoxy compound is a compound having in the molecule an unsaturated group which permits copolymerization with an ethylenic unsaturated compound, and an epoxy group.

The unsaturated epoxy compound includes, for example, unsaturated glycidyl esters and unsaturated glycidyl ethers which are represented by the following formulas (2) and (3), respectively.

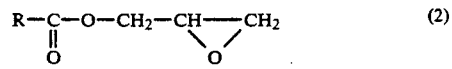

wherein R is a hydrocarbon group of 2-18 carbon atoms containing an ethylenic unsaturated bond.

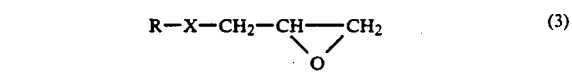

wherein R is a hydrocarbon group of 2-18 carbon atoms containing an ethylenic unsaturated bond, and X is

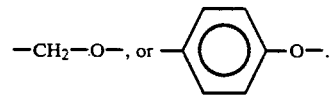

Specific examples of the unsaturated epoxy compound are glycidyl acrylate, glycidyl methacrylate, glycidyl itaconate, allyl glycidyl ether, 2-methyl allyl glycidyl ether, styrene p-glycidyl ether, etc.

The ethylenic unsaturated compound includes, for example, olefins, vinyl esters of saturated carboxylic acids of 2-6 carbon atoms, esters of saturated alcohols of 1-8 carbon atoms and acrylic acid, methacrylic acid, maleic acid or fumaric acid, vinyl halides, styrenes, nitriles, vinyl ethers, and acrylamides.

Specific examples of the ethylenic unsaturated compound are ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Of these, ethylene is particularly preferred.

For improving the impact resistance at low temperatures by lowering the glass transition temperature, it is preferable to use ethylene as second monomer and copolymerize a third monomer such as vinyl acetate, methyl acrylate, etc.

Although the amount of the third monomer copolymerized is not critical, it is usually 20% by weight or less, preferably 5 to 15% by weight.

The epoxy group containing copolymer can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer are a process comprising copolymerizing an unsaturated epoxy compound with ethylene in the presence of a radical-generating agent at 500 to 4,000 atmospheres and at 100° to 300° C. in the presence or absence of suitable solvent and chain transfer agent; a process comprising mixing a polypropylene with an unsaturated epoxy compound and a radical-generating agent, and subjecting the mixture to melt graft copolymerization in an extruder; and a process comprising copolymerizing an unsaturated epoxy compound with an ethylenic unsaturated compound in an inert medium such as water or organic solvent in the presence of a radical-generating agent.

In producing the thermoplastic olefin resin composition of the resent invention, a basic compound (Component J) can be added for accelerating the reaction of the graft copolymerized unsaturated carboxylic acid or derivative thereof in the modified polypropylene (at least one member selected from the Components A and B), the modified polypropylene composition (at least one member selected from the Components A' and B') and the modified rubber-like material (Component I) with the epoxy group of the epoxy group containing copolymer (Component G), and the reaction of the unreacted terminal carboxylic acid of the polyglutarimide (Component E) with the epoxy group of the epoxy group containing copolymer (Component G).

The addition of the basic compound (Component J) permits reduction of the reaction time and hence the time required for the production. As the basic compound (Component J), there are preferably used, for example, amine type organic compounds such as benzyldimethylamine, 2,4,6-tris(dimethylaminoethyl)-phenol, etc.

In producing the thermoplastic modified olefin resin composition, the reaction may be carried out by adding these basic compounds themselves, or the reaction may be carried out by adding them in the form of a master batch prepared by previously dispersing them to a high concentration in a portion of the resin constituents or a resin compatible with the thermoplastic resin composition in order to improve the dispersion.

As the rubber-like material (Component H) used for improving the impact resistance, in particular, the low-temperature impact resistance, there can be used, for example, ethylenic copolymer rubbers, propylene-butene rubber, isoprene-butylene rubber, polyisoprenes, polybutadienes, styrene block copolymers such as styrene-butadiene rubber, styrene-butadiene-styrene block copolymers, partially hydrogenated styrenebutadiene block copolymers, styrene-isoprene block copolymers, partially hydrogenated styrene-isoprene block copolymers and the like, linear low-density polyethylenes, and blends thereof.

As the ethylenic copolymer rubber, there can be used various ethylenic copolymer rubbers, for example, ethylene-α-olefin copolymer rubbers or ethylene-α-olefin-nonconjugated diene copolymer rubbers, typical examples of which are ethylene-propylene copolymer rubbers (hereinafter abbreviated as "EPM") and ethylene-propylene-nonconjugated diene copolymer rubbers (hereinafter abbreviated as "EPDFM"), ethylene-vinyl acetate copolymers, ethylene-methyl acrylate copolymers, ethylene-methyl methacrylate copolymers, ethylene-ethyl acrylate copolymers, ethylene-ethyl methacrylate copolymers, ethylene-butyl acrylate copolymers, ethylene-butyl methacrylate copolymers, ethylene-acrylic acid (or a partial metal salt thereof) copolymers, ethylene-methacrylic acid (or a partial metal salt thereof) copolymers, ethylene-acrylic acid-acrylic ester copolymers, ethylene-methacrylic acid-acrylic ester copolymers, ethylene-acrylic acid-methacrylic ester copolymers, ethylene-methacrylic acid-methacrylic ester copolymers, ethylene-vinyl alcohol copolymers, ethylene-vinyl acetate-vinyl alcohol copolymers, ethylene-styrene copolymers, etc. These ethylenic copolymer rubbers can be used alone or as a mixture thereof. They can be used in admixture with low-density polyethylenes or high-density polyethylenes which have a good compatibility with the ethylenic copolymer rubbers.

The modified rubber-like material (Component I) is a product obtained either by graft copolymerizing an unsaturated carboxylic acid or a derivative thereof or a combination of an unsaturated carboxylic acid or a derivative thereof and an unsaturated aromatic monomer onto the rubber-like material (Component H), if necessary, in the presence of a free-radical initiator, or by introducing an unsaturated carboxylic acid or a derivative thereof or a combination of an unsaturated carboxylic acid or a derivative thereof and an unsaturated aromatic monomer into the α-olefin main chain by direct copolymerization in the presence of a polymerization initiator and a catalyst.

Although the rubber-like material (Component H) and a starting rubber-like material for the modified rubber-like material (Component I) are not critical, ethylene copolymers and styrene block copolymers are suitably used as these materials. Among ethylenic copolymers, ethylene-α-olefin copolymer rubbers and ethylene-α-olefin-nonconjugated diene copolymer rubbers are particularly preferred. Specific examples of ethylene-α-olefin copolymer rubbers are copolymers of ethylene and other α-olefin such as propylene, 1-butene, 1-pentene, 1-hexene, 4-methyl-1-pentene, 1-octene, etc., and terpolymer rubbers such as ethylene-propylene-1-butene copolymers and the like. Of these, ethylene-propylene copolymer rubber and ethylene-1-bitene copolymer rubber are preferably used.

Ethylene-α-olefin-nonconjugated diene copolymer rubbers can also be used. It is preferable to adjust the nonconjugated diene content of the starting rubber to 3% by weight or less. When the nonconjugated diene content exceeds 3% by weight, gelation occurs during kneading in some cases.

The ethylene content of the ethylene-o-olefin copolymer rubber is preferably 15 to 85% by weight, more preferably 40 to 80% by weight. A highly crystalline copolymer having an ethylene content of more than 85% by weight is apt to become difficult to process under usual rubber molding conditions. An ethylene-o-olefin copolymer rubber having an ethylene content of less than 15% by weight is apt to lose its rubber properties because the glass transition temperature (Tg) increases.

The number average molecular weight of the ethylene-o-olefin copolymer rubber is preferably such that the rubber can be kneaded in an extruder, and it is usually 10,000 to 100,000. When the molecular weight is too low handling of the rubber at the time of feeding to an extruder tends to be difficult. When the molecular weight is too high, processing of the rubber tends to be difficult due to the lowering of the fluidity.

The molecular weight distribution of the ethylene-α-olefin copolymer rubber is not critical, and there can usually be used any commercially available copolymer rubbers having various molecular weight distributions, for example, monomodal distribution and bimodal distribution.

The Q value (weight average molecular weight/number average molecular weight) of the molecular weight distribution is preferably in the range of 1 to 30, more preferably 2 to 20.

Said copolymer rubber is produced using one of the so-called Ziegler-Natta catalysts which are usually used production catalysts. As the Ziegler-Natta catalyst, there is used, for example, a combination of an organoaluminum compound and a trivalent to pentavalent vanadium compound soluble in hydrocarbon solvents. As the aluminum compound, there can be used alkylaluminum sesquichloride, trialkylaluminum, dialkylaluminum monochloride, and mixtures thereof. As the vanadium compound, there can be used, for example, vanadium oxytrichloride, vanadium tetrachloride, and vanadate compounds represented by the formula $VO(OR^8)_8X_{3-q}$ ($0 < q \leq 3$, $R^8$ is a straight-chain, branched-chain, or cyclic hydrocarbon having 1 to 10 carbon atoms, and X is a halogen selected from Cl, Br and I).

Among styrene block copolymers, partially hydrogenated styrene-butadiene block copolymers are particularly preferred. The partially hydrogenated styrene-butadiene block copolymers are produced by partial hydrogenation of styrene-butadiene block copolymers. Their structure and production process are described below.

In the partially hydrogenated styrene-butadiene block copolymers, the number average molecular weight of block copolymer rubber is 10,000 to 1,000,000, preferably 20,000 to 300,000; the number average molecular weight of unsaturated aromatic polymer block in the block copolymer rubber is 1,000 to 200,000, preferably 2,000 to 100,000; the number average molecular weight of conjugated diene polymer block is 1,000 to 200,000, preferably 2,000 to 100,000; and the weight ratio of unsaturated aromatic polymer block to conjugated diene polymer is 2/98 to 60/40, preferably 10/90 to 40/60.

Many processes have been proposed for producing block copolymer rubbers. As a typical process, the process disclosed in JP-B-40-23798 can yield a block copolymer rubber of an unsaturated aromatic hydrocarbon and a diene hydrocarbon by block polymerization in an inert solvent by the use of lithium catalyst or Ziegler-Natta catalyst.

Such a block copolymer rubber is hydrogenated in an inert solvent in the presence of a hydrogenation catalyst, for example, by any of the methods disclosed in JP-B-42-8704, JP-B-43-6636, JP-B-46-208143, etc. The hydrogenation rate is such that at least 50%, preferably 80% or more, of the polymer block B is hydrogenated and that 25% or less of aromatic unsaturated bonds in the unsaturated aromatic polymer block are subjected to nuclear hydrogenation. A typical example of the thus partially or completely hydrogenated block copolymer is KRATON®-G (a trade name) commercially available from Shell Chemical Co., U.S.A.

In producing the modified rubber-like material (component I), various conventional methods can be employed for graft copolymerizing the graft monomer(s) onto a starting rubber-like material There can be employed, for example, a method comprising mixing a starting rubber-like material, graft monomer(s) and a free-radical initiator followed by melt-kneading the resulting mixture in a melt-kneading apparatus to graft the graft monomer(s); a method comprising dissolving an ethylenic copolymer rubber in an organic solvent such as xylene, adding thereto a free-radical initiator under nitrogen, carrying out the reaction with heating and stirring, thereafter cooling the reaction mixture, followed by washing, filtering, and drying, and thereby obtaining a graft ethylenic copolymer rubber; a method comprising irradiating an ethylenic copolymer rubber with ultraviolet light or radiation in the presence of graft monomer(s); and a method comprising bringing an ethylenic copolymer rubber into contact with oxygen or ozone in the presence of graft monomer(s).

In consideration of cost factor, it is most preferable to employ the method comprising melt kneading in a melt-kneading apparatus and thereby carrying out graft copolymerization.

In this invention, the modified rubber-like material (Component I) can be obtained by melt-kneading the starting rubber-like material with an unsaturated carboxylic acid or a derivative thereof and if necessary, a free-radical initiator or with an unsaturated carboxylic acid or a derivative thereof, an unsaturated aromatic monomer and if necessary, a free-radical initiator at a temperature of 200° to 280° C., preferably 230° to 260° C. for a residence time of 0.2 to 10 minutes, which is varied depending on the kind of the free-radical initiator, with an extruder, Banbury mixer, kneader, or the like.

Since the presence of too large an amount of oxygen during the kneading results in formation of a gel or serious coloring in some cases, the kneading is preferably conducted in the substantial absence of oxygen.

When the kneading temperature is lower than 200° C., no desired amount of unsaturated dicarboxylic acid anhydride added can be attained, so that a small improving effect on the degree of graft reaction can be obtained in some cases. When the kneading temperature is higher than 280° C., only small improving effect on the degree of graft reaction is brought about and in some cases, formation of a gel, coloring, etc. are liable to occur.

A kneading machine for the modification is not critical. An extruder is usually preferred because it permits continuous production. The extruder preferably has a single screw or twin screws which are suitable for uniformly mixing fed starting materials.

For removing unreacted constituents (unsaturated carboxylic acid or derivative thereof, unsaturated aromatic monomer, free-radical initiator,, etc.), by-products such as their oligomers and decomposition products from the reaction products, the product can be purified by sucking through vent lines in the middle of the extruder or near its outlet by means of a vacuum pump, or by dissolution of the product in a suitable solvent, followed by deposition. It is also possible to conduct heat treatment at a temperature of 60° C. or higher, or draw a vacuum with melting.

Although the above three or four components can be separately fed to a kneading machine, it is also possible to use a previously prepared uniform mixture of some or all of the three or four components. For example, there can be employed a method which comprises impregnating the rubber with the free-radical initiator and the unsaturated aromatic monomer, feeding the rubber, unsaturated carboxylic acid or derivative thereof and the like at the same time at the time of kneading, and kneading them. There can also be employed, for example, a method which comprises feeding the free-radical initiator and/or the unsaturated carboxylic acid or derivative thereof and the unsaturated aromatic monomer in the middle of the extruder, and thereby conducting modification.

If necessary, to the modified rubber-like material (Component I) can be added antioxidants, heat stabilizers, light stabilizers, nucleating agents, lubricants, antistatic agents, inorganic or organic colorants, rust preventives, crosslinking agents, foaming agents, plasticizers, fluorescent agents, surface treating agents, surface brightners and the like during the modification or the after-treatment.

The unsaturated carboxylic acid or derivative thereof and the free-radical initiator which are used in the modified rubber-like material (Component I) can be selected from the compounds used for producing the graft polypropylene (component A) and the like. As the unsaturated aromatic monomer, styrene is most preferable. There can also be used o-methylstyrene, p-methylstyrene, α-methylstyrene, vinyltoluene, divinylbenzene and mixtures thereof.

In producing the modified rubber-like material (Component I), the unsaturated aromatic monomer is used for preventing gel formation and improving the degree of graft reaction. The amounts used of the unsaturated aromatic monomer and the unsaturated carboxylic acid or derivative thereof are preferably 0.2 to 20 parts by weight and 0.5 to 15 parts by weight, respectively, per 100 parts by weight of the starting rubber-like material. When the unsaturated aromatic monomer is used, the amount used of the unsaturated carboxylic acid or derivative thereof is preferably 0.5 to 15 parts by weight, and the weight ratio of the unsaturated aromatic monomer to the unsaturated carboxylic acid or derivative thereof is preferably 0.1 to 3.0, more preferably 0.5 to 2.0.

When the weight ratio of the unsaturated aromatic monomer to the unsaturated carboxylic acid or derivative thereof is less than 0.1, there is brought about no desirable effect on prevention of gel formation and improvement of the degree of graft reaction in some cases. When the weight ratio exceeds 3.0, the effect of the unsaturated aromatic monomer hits the ceiling in some cases.

Although the amount used of the free-radical initiator depends on the kind thereof and the kneading conditions, the free-radical initiator can be used in an amount of usually 0.005 to 1.0 part by weight, preferably 0.01 to 0.5 part by weight, per 100 parts by weight of the starting rubber-like material. When the amount used is less than 0.005 part by weight, it tends to be difficult to attain a desirable amount of the unsaturated carboxylic acid or derivative thereof added, and in some cases, the effect of increasing the amount of the unsaturated carboxylic acid or derivative thereof added, by the co-use of the unsaturated aromatic monomer is lessened. When the amount used exceeds 1.0 part by weight, formation of a gel tends to occur.

Although the amount of the unsaturated carboxylic acid or derivative thereof added in the modified rubber-like material (Component I) thus obtained is not critical, it is preferably 0.1 to 5% by weight, more preferably 0.15 to 1.5% by weight. The amount of the unsaturated aromatic monomer added in the modified rubber-like material (Component I) is preferably 0.05 to 5% by weight, more preferably 0.05 to 1.0% by weight. The Mooney viscosity ($ML_{1+4}$, 121° C.) of the modified rubber-like material (Component I) is preferably 5 to 120, more preferably 60 to 80.

For producing the modified rubber-like material (Component I), there can be used another process which comprises introducing the unsaturated carboxylic acid or derivative thereof into the main chain by copolymerization in the presence of a polymerization initiator and a catalyst. In general, the modified rubber-like material (Component I) can be produced by the conventional high-pressure radical polymerization described below. It can be obtained by copolymerizing ethylene with a monomer radical-copolymerizable therewith (a comonomer) by the use of a radical-generating agent such as organic peroxide, oxygen or the like. The copolymerization reaction is carried out usually at a polymerization temperature of 130° to 300° C. and a polymerization pressure of 500–3,000 kg/cm$^2$.

Specific examples of the radical-copolymerizable monomer are unsaturated carboxylic acids such as acrylic acid, methacrylic acid, etc. and esterified products thereof, vinyl esters such as vinyl acetate, etc. Specific examples of the esterified products of unsaturated carboxylic acids are methyl acrylate, ethyl acrylate, methyl methacrylate and glycidyl methacrylate. These comonomers can be used alone or in combination of two or more thereof.

Although the content of the comonomer in the modified rubber-like material (Component I) obtained by direct copolymerization is not critical, it is preferably 0.1 to 40% by weight, more preferably 1 to 35% by weight. When the content of the comonomer is less than 0.1% by weight, the product has no improved quality in some cases.

Of these copolymers, ethylene-acrylic acid copolymers and ethylene-methacrylic acid copolymers are preferred. However, the copolymers exemplified above as the rubber-like material (Component H) and starting rubber like materials for the modified rubber-like material (Component I) are excluded.

The modified polypropylene compositions (Components A' and B') are compositions prepared by co-modification by adding an unsaturated carboxylic acid or a derivative thereof, or a combination of an unsaturated carboxylic acid or a derivative thereof and an unsaturated aromatic monomer, respectively, to both a starting polypropylene and a starting rubber-like material.

In detail, for producing modified polypropylene compositions (Components A' and B') the co-modification can be carried out by graft copolymerizing an unsaturated carboxylic acid or a derivative thereof, or a combination of an unsaturated carboxylic acid or a derivative thereof and an unsaturated aromatic monomer, onto both a starting polypropylene and a starting rubber-like material, if necessary, in the presence of a free-radical initiator by the same process as used for producing each of the modified polypropylene (Component A), the modified polypropylene (Component B) and the modified rubber-like material (Component I).

For placing the starting polypropylene and the starting rubber-like material together, there can be employed the following various conventional methods. When both starting materials are pellets, powder, or ground products, there can be employed, for example, a method comprising feeding the starting materials to co-modifying apparatus such as an extruder separately or through the same feed opening, and thereby placing them together in the apparatus; and a method comprising premixing the starting materials uniformly with a simple mixer such as tumbler or Henschel mixer When either of the starting materials is a large solid such as veil, there can be employed, for example, a method comprising melt-kneading the starting materials with a batch melt-kneading apparatus such as roll mill, kneader or Banbury mixer to homogenize them previously, and pelletizing or grinding the resulting mixture to facilitate feeding to a co-modifying apparatus.

The starting polypropylene and the starting rubber-like material can be co-modified by the same modification process as used for obtaining the modified polypropylene (Component A or B) or for obtaining the modified rubber-like material (Component I), except that these starting materials are placed together.

Although in the co-modification, the blending proportions of the starting polypropylene and the starting rubber-like material can be properly chosen, they are preferably determined in consideration of the proportions between the modified polypropylene (Component A), the modified polypropylene (Component B) and the modified rubber-like material (Component I) in the thermoplastic olefin resin composition of the present invention.

In the co-modification, the amount of the unsaturated carboxylic acid or derivative thereof is preferably 0.01 to 20 parts by weight, more preferably 0.1 to 5 parts by weight, per 100 parts by weight of the sum of the starting polypropylene and the starting rubber-like material, and if necessary, a free-radical initiator can be used in an amount of preferably 0 to 5 parts by weight, more preferably 0.001 to 2 parts by weight.

For dispersing the starting polypropylene and the starting rubber-like material while co-modifying them dynamically, it is preferable to use a high-kneading melt-kneading apparatus such as high-kneading twin screw extruder.

Although the amount of the unsaturated carboxylic acid or derivative thereof added in the modified polypropylene compositions (Components A' and B') is not critical, it is usually 0.10 to 0.50% by weight, preferably 0.20 to 0.45% by weight. Maleic anhydride is preferable as the unsaturated carboxylic acid or derivative thereof. Although the melt flow rate of the modified polypropylene compositions (Components A' and B') is not critical, it is usually 5-50 g/10 min, preferably 10-20 g/10 min. Although the amount of the unsaturated aromatic monomer added in the modified propylene composition (Component B') is not critical, it is usually 0.5% by weight. Styrene is preferable as the unsaturated aromatic monomer.

One preferable embodiment of the present invention is to use the thermoplastic olefin resin composition of the present invention in the form of composite materials obtained by further adding flame retardants or flame-retarding assistants, lubricants, nucleating agents, plasticizers, dyes, pigments, antistatic agents, anti-oxidants, weather resistance improvers, etc.

In the thermoplastic olefin resin composition of the present invention, the modified polypropylene type resin composition (Component D or D') as first component is contained in an amount of 1 to 99% by weight, preferably 5 to 95% by weight, more preferably 50 to 80% by weight, based on the weight of the resin composition (Component F or F'). When the content of the modified polypropylene type resin (Component D or D') is less than 1% by weight, the molding processability, toughness, water resistance, chemical resistance, and the like are not sufficient.

When a mixture of a modified polypropylene (Component A) and a polypropylene (Component C) is used as the modified polypropylene type resin (Component D or D'), the content of the modified polypropylene (Component A) in this mixture is preferably 5% by weight or more. When the content is less than 5% by weight, the final resin composition tends to be poor in compatibility and dispersibility, and it is difficult to attain sufficient toughness and impact resistance. Moreover, improvement of the coating properties, adhesive properties, printability and the like are not sufficient in some cases.

The polyglutarimide (Component E) is contained in an amount of 99 to 1% by weight, preferably 95 to 5% by weight, more preferably 20 to 50% by weight, based on the weight of the resin composition (Component F or F'). The polyglutarimide (Component E) has an improving effect on the heat resistance, stiffness, and the like, but when its content is less than 1% by weight, desirable heat resistance, stiffness and the like cannot be attained. When the content exceeds 99% by weight, the impact resistance and the fluidity are deteriorated and the specific gravity is increased.

In the present invention, the epoxy group containing copolymer (Component G) is blended in an amount of 0.1 to 300 parts by weight, preferably 1 to 200 parts by weight, more preferably 2 to 5 parts by weight, per 100 parts by weight of the resin composition (Component F or F') composed of the modified polypropylene type resin (Component D or D') and the polyglutarimide (Component E). When the blending amount is less than 0.1 part by weight, the thermoplastic olefin resin composition is poor in compatibility and dispersibility. Moreover, the toughness and the impact resistance are not sufficient and the extrusion stability is low. Even when it is 100 parts by weight or more, the resulting thermoplastic olefin resin composition is useful as a thermoplastic elastomer, but when the blending amount exceeds 300 parts by weight, the toughness, heat resistance and the like are greatly deteriorated and no desirable result can be obtained.

When a rubber-like material (Component H) or a modified rubber-like material (Component I), or both, are added for improving the impact resistance, in particular, the low-temperature impact resistance, they are added in an amount of 0.1 to 300 parts by weight, preferably 1 to 200 parts by weight, more preferably 20 to 25 parts by weight, per 100 parts by weight of the resin composition (Component F or F') composed of the modified polypropylene type resin (Component D or D') and the polyglutarimide (Component E). When their amount is less than 0.1 part by weight, no impact resistance improving effect is brought about in some cases. Even when it is 100 parts by weight or more, the resulting thermoplastic olefin resin composition is useful as a thermoplastic elastomer, but wen it exceeds 300 parts by weight, the toughness, heat resistance and the like are apt to be seriously deteriorated and no desirable result can be obtained in some cases.

When a basic compound (component J) is used as a reaction accelerator, its amount is usually 5 parts by weight or less, preferably 0.01 to 2 parts by weight, per 100 parts by weight of the resin compound composed of the polypropylene type resin composition (Component D or D') and the polyglutarimide (Component E). When the intensity of kneading is sufficient and the residence time in a kneading machine is sufficient for the reaction, the basic compound (Component J) need not to be blended. When the amount exceeds 5 parts by weight a marked reaction accelerating effect is brought about, but the appearance and smell of molded article are very inferior in some cases because of bleeding and the like.

A method for kneading the thermoplastic olefin resin composition of the present invention is not critical, and conventional methods can be used.

Although a method comprising mixing the starting materials in solution followed by evaporation of the solvent or precipitation in a non-solvent is effective, a method comprising kneading the starting materials in molten state is often employed in practice from an industrial viewpoint. For the melt-kneading, there can be used conventional kneading apparatus such as Banbury mixer, extruder, roll mill, various kneaders, etc.

In the kneading, it is preferable to mix the resin components all in the form of powder or pellets uniformly and previously in an apparatus such as tumbler or Henschel mixer. If necessary, it is also possible to omit the mixing and feed predetermined amounts of the resin components to a kneading apparatus individually.

When the basic compound (Component J) for accelerating the reaction is used in the form of powder or master batch, either of the methods described above can be employed. When the basic compound is a liquid, it is preferable to mix it with the resin components previously in a tumbler or a Henschel mixer. It is also possible to equip a kneading apparatus with a metering pump and add the liquid through a piping.

The kneaded resin composition is molded by various molding methods such as injection molding, extrusion molding, etc. To the composition of the present invention can also be applied a method in which the starting materials are dry blended during injection molding or extrusion molding without a step of previous kneading, and kneaded directly during melt processing to obtain a molded product.

The order of kneading of the constituents of the present inventive composition is not critical. For example, any of the following orders may be employed. (1) The modified polypropylene (Component A) or the modified polypropylene composition (Component A'), the polypropylene (Component C), the polyglutarimide (Component E), the epoxy group containing copolymer (Component G), the rubber-like material (Component H) and/or the modified rubber-like material (Component I) and the basic compound (Component J) are kneaded in on lot. (2) The modified polypropylene (Component A) and the polypropylene (Component C), otherwise the modified polypropylene (Component A') and the polypropylene (Component C) are firstly kneaded to produce Component D or D', respectively, followed by kneading therewith the polyglutarimide (Component E), the rubber-like material (Component H) and/or the modified rubber-like material (Component I) and the basic compound (Component J). (3) Component D or D' and the polyglutarimide (Component E) are firstly kneaded, followed by kneading therewith the epoxy group containing copolymer (Component G), the rubber-like material (Component H) and/or modified rubber-like material (Component I) and the basic compound (Component J). Other kneading orders may also be employed. However, when the modified polypropylene (Component A) or the modified polypropylene composition (Component A') and the epoxy group containing copolymer (Component G); the epoxy group containing copolymer (Component G) and the modified rubber-like material (Component I); or the polyglutarimide (Component E) and the epoxy group containing copolymer (Component G), are firstly blended, gelation occurs during the kneading in some cases, depending on the proportions of the two components of each combination. In this case, it is necessary to choose the proportions of the two components properly and knead them firstly.

In order to further simplify the kneading step, a step of previously producing the modified polypropylene composition (Component A') can be incorporated into a kneading step for producing the thermoplastic olefin resin composition of the present invention. That is, the thermoplastic olefin resin composition can be produced by co-modifying the starting polypropylene and the starting rubber-like material in the first stage, and then adding the polypropylene (Component C), the polyglutarimide (Component E), the epoxy group containing copolymer (Component G) and the basic compound (Component J) to the co-modified product in molten state. The same procedure can be adopted in the case of the modified polypropylene (Component A).

For kneading the thermoplastic olefin resin composition of the present invention more efficiently, it is recommendable to use a high-kneading twin screw extruder having a long L/D ratio and two or more feed openings. That is, the thermoplastic olefin resin composition can be efficiently produced by feeding the starting materials for conducting modification, i.e., the starting materials for the modified polypropylene composition (Component A') or the modified polypropylene composition (Component A), through the first feed opening, modifying them sufficiently until they are moved to the second feed opening, and feeding the other constituents properly through the second and subsequent feed openings.

For more remarkable exhibition of physical properties of the thermoplastic olefin resin composition of the present invention, various kneading methods, for example, the following methods can be employed. For satisfactory exhibition of the impact resistance, there can be employed a method comprising kneading a portion of the epoxy group containing copolymer (Component G) with the polyglutarimide (Component E), followed by kneading therewith the other constituents. For efficient exhibition of the reaction-accelerating effect of the basic compound (Component J), there can be employed a method comprising preparing a master batch previously by dispersing the basic compound in one resin constituent which constitutes the thermoplastic olefin resin composition of the present invention, or in a resin compatible with said thermoplastic olefin resin composition, to a high concentration, and then kneading the master batch with the other constituents.

The thermoplastic resin composition of the present invention can easily be molded by usual molding methods such as injection molding, extrusion molding, compression molding, blow molding, roll molding, laminated molding, vacuum forming, pressure molding, etc. to give molded products. To the composition of the present invention can also be applied a method in which the starting materials are dry blended during injection molding or extrusion molding without a step of previous kneading, and kneaded directly during melt processing to obtain a molded product.

Among the above molding methods, injection molding is preferred from the viewpoint of productivity and the like. Pellets of the composition are dried in a vacuum dryer, a hot-air dryer or the like, and then injection-molded under predetermined conditions including injection speed, injection time, cooling temperature, etc., to obtain a molded product.

Molded products obtained from the thermoplastic resin composition of the present invention can be used as automobile parts, electric and electronic parts, etc. Molded parts for automobile include exterior parts such as bumpers, fenders, aprons, hood panels, fascia boards, rocker panels, rocker panel reinforces, floor panels, rear quarter panels, door panels, door supports, roof top, trunk lid, etc., interior parts such as instrument panel, console box, glove compartment, shift knob, pillar garnishes, door trims, steering wheel, armrests, window louvers, carpets, headrests, seat belts, seats, etc., parts in engine room, such as distributer cap, air cleaner, radiator tank, battery case, radiator shroud, washer tank, cooling fan, heater case, etc., mirror body, wheel covers, trunk trims, trunk mat, gasoline tank, and the like.

The thermoplastic olefin resin composition of the present invention can be advantageously used in, among the above molded parts for automobile, bumpers and fenders which are required to have excellent stiffness and low-temperature penetration impact strength.

The following examples serve to give specific illustration of the practice of the present invention but they are not intended in any way to limit the scope of the present invention.

Methods for measuring the physical properties in the examples are described below.

(1) Specific gravity

Measured acccording to the method prescribed in JIS K6758.

(2) Melt flow rate

Measured according to the method prescribed in JIS K6758. The measuring temperature was 230° C. and the measurement was carried out under a load of 2.16 kg unless otherwise specified.

(3) Tensile test

Carried out according to the method prescribed in ASTM D638. The thickness of a test piece was 3.2 mm, and the tensile yield strength and the tensile elongation were evaluated. The measuring temperature was 23° C. unless otherwise specified.

(4) Flexural test

Carried out according to the method prescribed in JIS K7203. The thickness of a test piece was 3.2 mm, and the flexural modulus and the flexural strength were evaluated under conditions of a span length of 50 mm and a loading rate of 1.5 mm/min. The measuring temperature was 23° C. unless otherwise specified. When the measurement was carried out at a temperature other than 23° C., the sample was subjected to the measurement after having been conditioned in a constant temperature bath at a predetermined temperature for 30 minutes.

(5) Izod impact strength

Measured according to the method prescribed in JIS K7110. The thickness of a test piece was 3.2 mm and the notched impact strength was evaluated. The measuring temperature was 23° C. unless otherwise specified. When the measurement was carried out at a temperature other than 23° C., the sample was subjected to the measurement after having been conditioned in a constant temperature bath at a predetermined temperature for 2 hours.

(6) Penetration impact strength

A high rate impact tester [Model RIT-8000, mfd. by Rheometrics Inc. (USA)] was used. A flat test piece of 3 mm thickness was fixed by means of a 2-inch circular holder and a ⅝-inch (tip spherical surface: 5/16 inch R) impact probe was hit against the test piece at a speed of 3 m/sec. The degree of deformation of the test piece and the stress were measured by means of the tester, and the curve shown in FIG. 1 was drawn based on the measured values. The penetration impact strength was evaluated by integrating the area long the curve.

FIG. 1 shows an example of measurement chart in evaluating the penetration impact strength. The axis of abscissa refers to displacement (D: mm) indicating the deformation of a test piece and the axis of ordinate to stress (N: newton) corresponding to individual values of the displacement. Said measurement chart is obtained by detecting the values of the displacement and the stress continuously and plotting these values on a X-Y plotter continuously.

The yield point energy is determined by integrating the area with respect to the displacement and the stress from the rising of detected stress to the point of yield of a material. The total energy is determined by integrating the area with respect to the displacement and the stress from the rising of detected stress to the fracture point of the material.

The state of fracture of the material is judged to be ductile fracture (D) or brittle fracture (B) by observing an actual fractured test piece of the material.

An energy value required for yield of the material and an energy value required for fracture of the material were evaluated in terms of energy at the yield point and the total energy, respectively. Both of them are expressed in joule (J).

The sample was conditioned in a constant temperature bath attached to the apparatus. The test piece was placed in a constant temperature bath previously adjusted to a predetermined temperature, conditioned for 2 hours, and then subjected to the above test. The predetermined temperature was employed as the measuring temperature.

(7) Heat distortion temperature

Measured according to the method prescribed in JIS K7207. The fiber stress was measured at 4.6 kg/cm$^2$.

(8) Rockwell hardness

Measured according to the method prescribed in JIS K7207. The thickness of a test piece was 3.2 mm. As a steel ball, R was used. The evaluation value is expressed on R scale.

(9) Amounts of maleic anhydride and styrene added

The amount of maleic anhydride added in the modified polypropylene (Component A) or the modified polypropylene composition (Component A′) was determined by dissolving a small amount of each sample in hot xylene, adding anhydrous acetone to cause precipitation, re-dissolving the thus purified sample in xylene, and titrating the resulting solution with a methanolic solution of NaOH with heating (110°–120° C.) by using phenolphthalein as an indicator.

The amount of maleic anhydride added in the modified rubber-like material (Component I) was determined by dissolving a small amount of each sample in toluene, adding anhydrous acetone to cause precipitation, re-dissolving the thus purified sample in toluene, and titrating the resulting solution with a solution of KOH in ethanol with heating (85° C.) by using phenolphthalein as an indicator.

The amount of styrene added was determined from the intensity of au: absorption peak due to a substituted benzene ring which appeared in an infrared absorption spectrum measured for the aforesaid purified sample.

(10) Mooney viscosity

Measured according to the method prescribed in JIS K6300. The measuring temperature was 121° C.

(11) Number average molecular weight

Measured by a gel permeation chromatography (GPC) under the following conditions:

| | |
|---|---|
| GPC: | type 150C, mfd. by Waters |
| Column: | Sodex 80MA, mfd. by Showa Denko K.K. |
| Amount of sample: | 300 μl (polymer concentration 0.2 wt %) |
| Flow rate: | 1 ml/min |
| Temperature: | 135° C. |
| Solvent: | trichlorobenzene |

A calibration curve for calculating the number average molecular weight was prepared by a conventional method by using standard polystyrene mfd. by TOHSOH CORP. Data processing was conducted by means of a data processor CP-8 Model III mfd. by TOHSOH CORP.

(12) Ethylene content

Determined by the use of a calibration curve from the absorbances of characteristic absorptions due to methyl ($-CH_3$) and methylene ($-CH_2-$) which appeared in an infrared spectrum measured by using a pressed sheet previously prepared.

(13) Vicat softening point

Measured according to the method prescribed in ASTM D1525, at a heating rate of 50° C./hour under a load of 1 kg.

(14) Conversion to imide

Determined by measuring the weight of nitrogen in polyglutarimide by means of an azotometer, dividing the measured value by the theoretical amount of nitrogen in the case of 100% conversion to imide, and multiplying the quotient by 100.

(15) Weight average molecular weight

Measured by a gel permeation chromatography by the use of tetrahydrofuran as a solvent.

The above test pieces for determining the physical properties were prepared under the following injection molding conditions unless otherwise specified. The thermoplastic resin composition was dried in a hot-air dryer at 120° C. for 2 hours and then injection molded by means of a IS150E type injection molding machine mfd. by Toshiba Machine Co., Ltd. at a molding temperature of 240° C. and a mold-cooling temperature of 70° C. for 15 seconds for injection and 30 seconds for cooling.

The thermoplastic olefin resin compositions described below were produced under the following conditions unless otherwise specified. Predetermined amounts of components are weighed individually, uniformly premixed in a Henschel mixer, and then kneaded in a twin screw continuous kneading machine (Model TEX 44 SS 30BW-2V, mfd. by JAPAN STEEL WORKS, LTD.) with suction through a vent at an extrusion rate of 30 kg/hour, a resin temperature of 240° C. and a screw revolution rate of 350 revolutions/min. The screws were composed of two sets of a triple-thread rotor and a triple-thread kneading disc of which sets were placed in two kneading zones, i.e., a zone next to the first feed opening and a zone next to the second feed opening, respectively.

EXAMPLES 1 AND 2 AND COMPARATIVE EXAMPLE 1

Tables 2-1 and 2-2

A modified polypropylene (Component A) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.7% by weight, and an isotactic pentad of boiling heptane insoluble of 0.952 was modified as follows which had been produced by slurry polymerization by the process disclosed in JP-A-60-28405.

With 100 parts by weight of the starting propylene homopolymer were uniformly mixed in a Henschel mixer 1.0 part by weight of maleic anhydride, 0.6 part by weight of the propylene homopolymer containing as free-radical initiator 8% by weight of 1,3-bis(t-butyl-peroxy-isopropyl) benzene (Sanperox ®-TY1.3 mfd. by Sanken Kako Co., Ltd.) supported thereon, and 0.1 part by weight of Irganox ® 1010 (mfd. by Ciba-Geigy Ltd.) as stabilizer. The resulting mixture was melt-keaded with a TEX 44 SS-30BW-2V type twin screw extruder mfd. by JAPAN STEEL WORKS, LTD., at a temperature of 220° C. for an average residence time of 1.5 minutes to obtain a maleic-anhydride-modified polypropylene (Component A) having an amount of maleic anhydride added of 0.08% by weight and a melt flow rate of 36 g/10 min. Said modified polypropylene (Component A) is hereinafter abbreviated as M-PP-1.

A polyglutarimide (Component E) was produced in the following manner. A polymethyl methacrylate having a weight average molecular weight of 200,000 was fed to a non-intermeshing twin screw extruder (inner diameter of die: 20 mm) equipped with a pellet feed opening, amine feed opening, aperture, heater and cooler, and was melted. Then, methylamine was fed as an agent for conversion to imide, at a high pressure and reacted with the polymethyl methacrylate at 300° C.

The unreacted amine was removed through the aperture, and a transparent strand was obtained through the die portion. The physical properties of the polymer thus obtained are shown in Table 1.

TABLE 1

| Polyglutar-imide (D) | Vicat softening temperature (°C.) | Conversion to imide (%) | Weight average molecular weight |
|---|---|---|---|
| PGI-1 | 150 | 67 | 160,000 |
| PGI-2 | 170 | 82 | 145,000 |
| PGI-3 | 145 | 65 | 170,000 |
| PGI-4 | 160 | 80 | 150,000 |

An epoxy group containing copolymer (Component G) was produced in the following manner. A terpolymer having a weight ratio between ethylene, methyl acrylate and glycidyl methacrylate of 65:15:20 (wt %) and a melt flow rate of 21 g/10 min (190° C., load 2.16 kg) was produced by high-pressure radical polymerization according to the process disclosed in JP-A-46-23490 and JP-A-48-11888. This epoxy group containing copolymer is hereinafter abbreviated as E-MA-GMA-1.

A modified rubber-like material (Component 1) was produced in the following manner. With 100 parts by weight of pellets of ethylene-propylene copolymer rubber having a number average molecular weight of 60,000 and an ethylene content of 78% by weight were mixed in a Henschel mixer 2.0 parts by weight of maleic anhydride, 2.0 parts by weight of styrene and 1.0 part by weight of the propylene homopolymer containing as free-radical initiator 8% by weight of 1,3-bis(t-butyl-peroxyisopropyl)benzene (Sanperox ®-TY1,3, mfd. by Sanken Kako Co., Ltd.) supported thereon. Subsequently, the resulting mixture was melt-kneaded under nitrogen by means of a TEX 44 SS-30BW-2V type twin screw extruder mfd. by JAPAN STEEL WORKS, LTD., at a kneading temperature of 250° C. and an extrusion rate of 18 kg/hour to obtain a modified ethylene-propylene copolymer rubber having an amount of maleic anhydride added of 1.5% by weight, an amount of styrene added of 0.8% by weight and a Mooney viscosity ($ML_{1+4}$, 121° C.) of 70. Said modified ethylene propylene copolymer rubber is hereinafter abbreviated as MS-EPM-1.

The above starting materials were blended in the proportions shown in Table 2-1. Each blend was kneaded under the predetermined conditions to obtain a thermoplastic olefin resin composition. Test pieces were made of the composition under the predetermined injection molding conditions and subjected to evaluation of the physical properties by the predetermined methods. The results of evaluation of the physical properties are shown in Table 2-2. It can be seen that in Examples 1 and 2 of the present invention, the Izod impact strength and the penetration impact strength were greatly improved as compared with Comparative Example 1 in which the epoxy group containing copolymer (Component G) was not blended.

EXAMPLES 3 AND 4 AND COMPARATIVE EXAMPLE 2

Tables 2-1 and 2-2

A modified polypropylene (Component B) was produced in the same manner as in Example 1, except that there was used a starting propylene homopolymer having an isotactic pentad of boiling heptane insoluble of 0.955 produced by slurry polymerization by the process disclosed in JP-A-60-28405, and that styrene was mixed in an amount of 0.5 part by weight. There was obtained a maleic anhydride-styrene-modified polypropylene (Component B) having an amount of maleic anhydride added of 0.15% by weight, an amount of styrene added of 0.07% by weight and a melt flow rate of 21 g/10 min. This modified polypropylene (Component B) is hereinafter abbreviated as MS-PP-1.

The same polyglutarimides (Component E) as in Examples 1 and 2 were used.

An epoxy group containing copolymer (Component G) produced in the same manner as in Example 1 was used, but it was a terpolymer having a weight ratio between ethylene, vinyl acetate and glycidyl methacrylate of 85:5:10 (wt %) and a melt flow rate of 7 g/10 min (190° C., load: 2.16 kg). This epoxy group containing copolymer is hereinafter abbreviated as E-VA-GMA-1.

The same modified rubber-like material (Component I) as in Example 1 was used.

The above starting materials were blended in the proportions shown in Table 2-1. Each blend was kneaded under the predetermined conditions to obtain a thermoplastic olefin resin composition. Test pieces were made of the composition under the predetermined injection molding conditions and subjected to evaluation of the physical properties by the predetermined methods. The evaluation results are shown in Table 2-2. It can be seen that in Examples 3 and 4 of the present invention, the Izod impact strength and the penetration impact strength were greatly improved as compared with Example 2 in which no epoxy group containing copolymer was blended.

EXAMPLE 5

A polypropylene and a rubber-like material were co-modified in the following manner. As starting polypropylene and rubber-like material, there were used 77% by weight of the same polypropylene as in Example 1, and 23% by weight of a ground ethylene-propylene copolymer rubber having a number average molecular weight of 55,000 and an ethylene content of 47% by weight, respectively.

In the same manner as in Example 1, except that the amounts of maleic anhydride, styrene and the polypropylene containing the free-radical initiator supported thereon were changed to 1.5 parts by weight, 0.5 part by weight and 0.6 part by weight, respectively, per 100 parts by weight of a mixture of the starting polypropylene and the ethylene-propylene copolymer rubber there was obtained a co-modified polypropylene/ rubber-like material having an amount of maleic anhydride added of 0.18% by weight, an amount of styrene added of 0.1% by weight and a melt flow rate of 11 g/10 min.

Said co-modified polypropylene/rubber-like material is hereinafter abbreviated as MS-PP/EPR-1.

The same polyglutarimide (Component E) and epoxy group containing copolymer (Component G) as in Example 1 were used.

The above materials were blended in the proportions shown in Table 2-1. The blend was kneaded under the predetermined conditions to obtain a thermoplastic olefin resin composition. Test pieces were made of the composition under the predetermined injection molding conditions and subjected to evaluation of the physical properties by the predetermined methods.

It can be seen that in Example 5 of the present invention, the Izod impact strength and the penetration impact strength were greatly improved as compared with Comparative Example 2 in which no epoxy group containing copolymer was used.

The evaluation results are shown in Table 2-2.

EXAMPLES 6 and 7

Thermoplastic olefin resin compositions were obtained in the same manner as in Example 5, except that each of PGI-3 and PGI-4 was used as polyglutarimide (Component E). Their physical properties were evaluated.

The evaluation results are shown in Table 2-2.

EXAMPLE 8

In the same manner as in Example 5, except that the amounts of the starting polypropylene and the rubber-like material were changed to 69% by weight and 31% by weight, respectively, there was obtained a co-modified polypropylene/rubber-like material having an amount of maleic anhydride added of 0.21% by weight, an amount of styrene added of 0.12% by weight and a melt flow rate of 9 g/10 min. This co-modified polypropylene/rubber-like material is hereinafter abbreviated as MS-PP/EPR-2.

The same polyglutarimide (Component E) and epoxy group containing copolymer (Component G) as in Example 1 were used.

The above materials were blended in the proportions shown in Table 2-1. Using the blend, a thermoplastic resin composition was obtained in the same manner as in Example 5 and its physical properties were evaluated.

The evaluation results are shown in Table 2-2.

EXAMPLE 9

In the same manner as in Example 5, except that an ethylene-butene-1 copolymer rubber having a number average molecular weight of 50,000 and an ethylene content of 82% by weight was used as a rubber-like material, there was obtained a co-modified polypropylene/rubber-like material having an amount of maleic anhydride added of 0.25% by weight, an amount of styrene added of 0.15% by weight and a melt flow rate of 11 g/10 min. This co-modified polypropylene/rubber-like material is hereinafter abbreviated as MS-PP/EPR-3.

The same polyglutarimide (Component E) and epoxy group containing copolymer (Component G) as in Example 1 were used.

The above materials were blended in the proportions shown in Table 2-1. Using the blend, a thermoplastic olefin resin composition was obtained in the same manner as in Example 5 and its physical properties were evaluated. The evaluation results are shown in Table 2-2.

EXAMPLE 10

A co-modified polypropylene/rubber-like material having an amount of maleic anhydride added of 0.20% by weight and a melt flow rate of 13.1 g/10 min was obtained in the same manner as in Example 5 except for using as rubber-like material a styrene-ethylene-butylene-styrene block copolymer rubber (KRATON®-G 1657, mfd. by Shell Chemical Co.) having a number average molecular weight of 85,000, a number average molecular weight of styrene block of 50,000, a number average molecular weight of ethylene-butylene block of 35,000 and a weight ratio of styrene block to ethylene-butylene block of 30:70.

This co-modified polypropylene/rubber-like material is hereinafter abbreviated as MS-PP/EPR-4. The same polyglutarimide (Component E) and epoxy group containing copolymer (Copolymer G) as in Example 1 were used.

The above materials were blended in the proportions shown in Table 2-1. Using the blend, a thermoplastic olefin resin composition was obtained in the same manner as in Example 5 and its physical properties were evaluated.

EXAMPLE 11

Tables 2-1 and 2-2

The same starting materials as used in Example 3 and a basic compound (Component J), benzyldimethylamine (Sumicure® BD, mfd. by Sumitomo Chemical Co., Ltd.) as a reaction accelerator were blended in the proportions shown in Table 2-1. Using the blend, a thermoplastic resin composition was produced in the same manner as in Example 3 and its physical properties were evaluated The results of the evaluation are shown in Table 2-2.

Although satisfactory physical properties were attained in Example 3 of the present invention in which no basic compound (Component J) was blended, the Izod impact strength and the penetration impact strength are further improved in Example 11 in which the basic compound (Component J) was blended.

EXAMPLES 12 AND 13 AND COMPARATIVE EXAMPLES 3 AND 4

TABLES 2-1 AND 2-2

The above starting materials were blended in the proportion shown in Table 2-1. Each blend was kneaded under the predetermined conditions to obtain a thermoplastic olefin resin composition. Test pieces were made of the composition under the predetermined injection molding conditions and subjected to evaluation of the physical properties by the predetermined methods. The results of evaluation of the physical properties are shown in Table 2-2. It can be seen that in Examples 12 and 13 of the present invention, the Izod impact strength and the penetration impact strength were greatly improved as compared with Comparative Examples 3 and 4 in which the epoxy group containing polymer (Component G) was not blended.

The thermoplastic olefin resin composition of the present invention is not only good in molding processability but also markedly advantageous in that it can be molded products much superior in physical properties to those obtained from individual polymers constituting the thermoplastic resin composition.

The novel resin compositions provided according to the present invention can easily be processed into a molded product, a film, a sheet or the like by a molding method usually used for molding thermoplastic resins, for example, injection molding, extrusion molding or the like. Moreover, the product obtained by the processing has a very good balance among stiffness, heat resistance, impact resistance, scratch resistance, coating properties, oil resistance, chemical resistance, water resistance, etc.; and a very uniform and smooth appearance. The thermoplastic olefin resin composition of this invention can be advantageously used for a purpose in which especially high heat resistance and impact resistance, in particular, low-temperature impact resistance, are required.

TABLE 2-1

| | Constituent | | | | |
|---|---|---|---|---|---|
| No. | Modified polypropylene (Component D, wt %) | Polyglutarimide (Component E, wt %) | Epoxy group containing copolymer (Component G, wt %) | Modified rubber-like material (Component I, wt %) | Basic Compound (Component J) (part) |
| Example 1 | M-PP-1 60 | PGI-1 20 | E-MA-GMA-1 2 | MS-EPM-1 18 | — |

TABLE 2-1-continued

| No. | Modified polypropylene (Component D, wt %) | | Polyglutar-imide (Component E, wt %) | | Epoxy group containing copolymer (Component G, wt %) | | Modified rubber-like material (Component I, wt %) | | Basic Compound (Component J) (part) | |
|---|---|---|---|---|---|---|---|---|---|---|
| Example 2 | M-PP-1 | 60 | PGI-2 | 20 | E-MA-GMA-1 | 2 | MS-EPM-1 | 18 | — | |
| Example 3 | MS-PP-1 | 60 | PGI-1 | 20 | E-VA-GMA-1 | 2 | MS-EPM-1 | 18 | — | |
| Example 4 | MS-PP-1 | 60 | PGI-2 | 20 | E-VA-GMA-1 | 2 | MS-EPM-1 | 18 | — | |
| Example 5 | MS-PP/EPR-1 | 78 | PGI-1 | 20 | E-MA-GMA-1 | 2 | — | | — | |
| Example 6 | MS-PP/EPR-1 | 78 | PGI-3 | 20 | E-MA-GMA-1 | 2 | — | | — | |
| Example 7 | MS-PP/EPR-1 | 78 | PGI-4 | 20 | E-MA-GMA-1 | 2 | — | | — | |
| Example 8 | MS-PP/EPR-2 | 58 | PGI-1 | 40 | E-MA-GMA-1 | 2 | — | | — | |
| Example 9 | MS-PP/EPR-3 | 78 | PGI-1 | 20 | E-MA-GMA-1 | 2 | — | | — | |
| Example 10 | MS-PP/EPR-4 | 78 | PGI-1 | 20 | E-MA-GMA-1 | 2 | — | | — | |
| Example 11 | MS-PP-1 | 60 | PGI-1 | 20 | E-VA-GMA-1 | 2 | | 18 | Sumicure ® BD | 0.5 |
| Example 12 | MS-PP-1 | 78 | PGI-1 | 20 | E-VA-GMA-1 | 2 | — | | — | |
| Example 13 | MS-PP-1 | 55 | PGI-1 | 40 | E-VA-GMA-1 | 5 | — | | — | |
| Comparative Example 1 | MS-PP-1 | 60 | PGI-1 | 20 | — | | MS-EPM-1 | 20 | — | |
| Comparative Example 2 | MS-PP-1 | 60 | PGI-1 | 20 | — | | MS-EPM-1 | 20 | — | |
| Comparative Example 3 | MS-PP-1 | 80 | PGI-1 | 20 | — | | — | | — | |
| Comparative Example 4 | MS-PP-1 | 60 | PGI-1 | 40 | — | | — | | — | |

TABALE 2-2

| | Physical properties | | | | | |
|---|---|---|---|---|---|---|
| | | | Tensile properties | | Flexural properties | |
| No. | Specific gravity (g/cm$^3$) | Melt flow rate (g/10 min) | Strength at yield (kg/cm$^2$) | Elongation at break (%) | Modulus of elasticity (kg/cm$^2$) | Strength (kg/cm$^2$) |
| Example 1 | 0.948 | 16.2 | 197 | >200 | 11,300 | 273 |
| Example 2 | 0.948 | 12.1 | 194 | 164 | 11,000 | 270 |
| Example 3 | 0.948 | 13.2 | 209 | >200 | 11,900 | 291 |
| Example 4 | 0.948 | 10.1 | 206 | 164 | 11,600 | 288 |
| Example 5 | 0.948 | 15.1 | 215 | >200 | 11,500 | 261 |
| Example 6 | 0.948 | 16.5 | 193 | 40 | 12,200 | 286 |
| Example 7 | 0.948 | 14.7 | 212 | >200 | 11,600 | 269 |
| Example 8 | 0.948 | 5.8 | 198 | 60 | 11,600 | 244 |
| Example 9 | 0.948 | 14.3 | 245 | 170 | 13,000 | 323 |
| Example 10 | 0.948 | 19.8 | 186 | >200 | 9,100 | 230 |
| Example 11 | 0.948 | 9.1 | 222 | >200 | 12,100 | 303 |
| Example 12 | 0.972 | 15.6 | 350 | 85 | 17,000 | 520 |
| Example 13 | 1.034 | 7.5 | 448 | 50 | 19,700 | 620 |
| Comparative Example 1 | 0.947 | 22.1 | 253 | 25 | 12,800 | 358 |
| Comparative Example 2 | 0.947 | 22.1 | 265 | 25 | 13,400 | 376 |
| Comparative Example 3 | 0.972 | 16.8 | 410 | 22 | 18,900 | 580 |
| Comparative Example 4 | 1.034 | 12.6 | 515 | 11 | 24,600 | 780 |

| | Physical properties | | | | |
|---|---|---|---|---|---|
| | Izod impact strength | | Penetration impact strength (YE/TE) *[1] | Thermal deformation | Rockwell |
| | 23° C. (kg · cm/cm) | −30° C. | −30° C. (J: joule) | temp. (°C.) | hardness $H_R$ |
| Example 1 | 21 | 9.1 | 24/31 (D∼B) | 120 | 67 |
| Example 2 | 19 | 8.0 | 22/29 (D∼B) | 122 | 67 |
| Example 3 | 23 | 9.2 | 25/32 (D∼B) | 121 | 68 |
| Example 4 | 20 | 8.1 | 23/30 (D∼B) | 124 | 68 |
| Example 5 | 28 | 7.1 | 26/38 (D∼B) | 109 | 66 |
| Example 6 | 20 | 4.6 | 23/25 (B) | 111 | 67 |
| Example 7 | 26 | 7.1 | 29/37 (D∼B) | 109 | 68 |
| Example 8 | 16 | 5.7 | 25/27 (B) | 116 | 57 |
| Example 9 | 19 | 3.5 | 20/23 (B) | 115 | 83 |
| Example 10 | 26 | 7.6 | 31/44 (D∼B) | 110 | 68 |
| Example 11 | 29 | 11.6 | 28/37 (D∼B) | 126 | 75 |
| Example 12 | 6.5 | 3.5 | 1.5/2.2 (B) | 125 | 95 |
| Example 13 | 7.0 | 4.0 | 2.0/3.1 (B) | 128 | 93 |
| Comparative Example 1 | 3.3 | 2.0 | 0.5/1.4 (B) | 120 | 74 |
| Comparative Example 2 | 3.8 | 2.1 | 0.7/1.5 (B) | 121 | 75 |
| Comparative | 2.5 | 2.0 | 0.1/0.2 (B) | 127 | 97 |

TABALE 2-2-continued

| Example 3 Comparative Example 4 | 2.0 | 1.8 | 0.1/0.2 (B) | 131 | 98 |

Note:
*¹ Penetration impact strength, YE denotes yield point energy, TE denotes total energy, (D) and (B) indicate the states of fracture: (D) ductile fracture, (B): brittle fracture, (D–B): intermediate fracture state between (B) and (D)

What is claimed is:

1. A thermoplastic olefin resin composition comprising 100 parts by weight of a resin composition (Component F) consisting of 1 to 99% by weight of Component D and 99 and 1% by weight of a polyglutarimide (Component E); and 0.1 to 300 parts by weight of an epoxy group containing copolymer (Component G);

wherein Component D is at least one member selected from the group consisting of:

Component A, which is a modified polypropylene in which an unsaturated carboxylic acid or a derivative thereof is graft copolymerized onto a polypropylene;

Component B, which is a modified polypropylene in which an unsaturated carboxylic acid or a derivative thereof and an unsaturated aromatic monomer graft are copolymerized onto a polypropylene;

a mixture of Component A and a polypropylene; and a mixture of Component B and a polypropylene.

2. A thermoplastic olefin resin composition according to claim 1, wherein Component D is at least one member selected from the group consisting of Component B or a mixture of Component B and a polypropylene.

3. A thermoplastic olefin resin composition according to claim 2, wherein the unsaturated carboxylic acid or derivative thereof grafted is maleic anhydride, and the unsaturated aromatic monomer grafted is styrene.

4. A thermoplastic olefin resin composition according to claim 1, wherein the polyglutarimide (Component E) contains in the molecule at least 5% by weight of cyclic imide structural units represented by the formula:

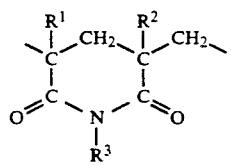

wherein each of $R^1$, $R^2$ and $R^3$ is a hydrogen atom or an aliphatic, aromatic or alicyclic hydrocarbon group having 1 to 20 carbon atoms.

5. A thermoplastic olefin resin composition according to claim 1, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

6. A thermoplastic olefin resin composition comprising 100 parts by weight of a resin composition (Component F') consisting of 1 to 99% by weight of Component D' and 99 to 1% by weight of a polyglutarimide (Component E); and 0.1 to 300 parts by weight of an epoxy group containing copolymer (Component G);

wherein Component D' is at least one member selected from the group consisting of:

Component A', which is a modified polypropylene composition in which an unsaturated carboxylic acid or a derivative thereof is graft copolymerized onto a mixture of a polypropylene and a rubber-like material;

Component B', which is a modified polypropylene composition in which an unsaturated carboxylic acid or a derivative thereof and an unsaturated aromatic monomer are graft copolymerized onto a mixture of a polypropylene and a rubber-like material;

a mixture of Component A' and a polypropylene; and a mixture of Component B' and a polypropylene.

7. A thermoplastic olefin resin composition according to claim 6, wherein Component D' is at least one member selected from the group consisting of Component B' or a mixture of Component B' and a polypropylene.

8. A thermoplastic olefin resin composition according to claim 7, wherein the unsaturated carboxylic acid or derivative thereof grafted is maleic anhydride, and the unsaturated aromatic monomer grafted is styrene.

9. A thermoplastic olefin resin composition according to claim 6, wherein the polyglutarimide (Component E) contains in the molecule at least 5% by weight of cyclic imide structural units represented by the formula:

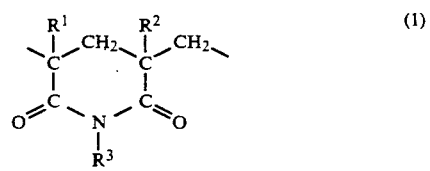

wherein each of $R^1$, $R^2$ and $R^3$ is a hydrogen atom or an aliphatic , aromatic or alicyclic hydrocarbon group having 1 to 20 carbon atoms.

10. A thermoplastic olefin resin composition according to claim 6, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

11. A thermoplastic olefin resin composition according to claim 6, wherein the rubber-like material is an ethylenic copolymer rubber.

12. A thermoplastic olefin resin composition comprising 100 parts by weight of a resin composition (Component F) consisting of 1 to 99% by weight of Component D and 99 to 1% by weight of a polyglutarimide (Component E);

0.1 to 300 parts by weight of an epoxy group containing copolymer (Component G); and 0.1 to 300 parts by weight of a rubber-like material (Component H) and/or a modified rubber-like material (Component I) in which one compound or a combination of compounds selected from the group consisting of an unsaturated carboxylic acid, a derivative of an unsaturated carboxylic acid, an unsaturated carboxylic acid and an unsaturated aromatic monomer, and a derivative of an unsaturated carboxylic acid and an unsaturated aromatic monomer, is graft copolymerized onto Component H;

wherein Component D is at least one member selected from the group consisting of:

Component A, which is a modified polypropylene in which an unsaturated carboxylic acid or a derivative thereof is graft copolymerized onto a polypropylene;

Component B, which is a modified polypropylene in which an unsaturated carboxylic acid or a derivative thereof and an unsaturated aromatic monomer are graft copolymerized onto a polypropylene;

a mixture of Component A and a polypropylene; and a mixture of Component B and a polypropylene.

13. A thermoplastic olefin resin composition according to claim 12, wherein Component D is at least one member selected from the group consisting of Component B or a mixture of Component B and a polypropylene; and Component I is a modified rubber-like material in which an unsaturated carboxylic acid or a derivative thereof and an unsaturated aromatic monomer are graft copolymerized onto Component H.

14. A thermoplastic olefin resin composition according to claim 13, wherein the unsaturated carboxylic acid or derivative thereof grafted is maleic anhydride, and the unsaturated aromatic monomer grafted is styrene.

15. A thermoplastic olefin resin composition according to claim 12, wherein the polyglutarimide (Component E) contains in the molecule at least 5% by weight of cyclic imide structural units represented by the formula:

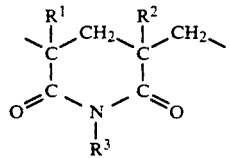

wherein each of $R^1$, $R^2$ and $R^3$ is a hydrogen atom or an aliphatic, aromatic or alicyclic hydrocarbon group having 1 to 20 carbon atoms.

16. A thermoplastic olefin resin composition according to claim 12, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

17. A thermoplastic olefin resin composition according to claim 12, wherein the rubber-like material (H) or the starting rubber-like material for the modified rubber-like material (I), or both, are ethylenic copolymer rubbers.

18. A thermoplastic olefin resin composition comprising 100 parts by weight of a resin composition (Component F) consisting of 1 to 99% by weight of Component D and 99 to 1% by weight of a polyglutarimide (Component E);

0.1 to 300 parts by weight of an epoxy group containing copolymer (Component G); and up to 5 parts by weight of a basic compound (Component J);

wherein Component D is at least one member selected from the group consisting of:

Component A, which is a modified polypropylene in which an unsaturated carboxylic acid or a derivative thereof is graft copolymerized onto a polypropylene;

Component B, which is a modified polypropylene in which an unsaturated carboxylic acid or a derivative thereof and an unsaturated aromatic monomer are graft copolymerized onto a polypropylene;

a mixture of Component A and a polypropylene; and a mixture of Component B and a polypropylene.

19. A thermoplastic olefin resin composition according to claim 18, wherein Component D is at least one member selected from the group consisting of Component B and a mixture of Component B and a polypropylene.

20. A thermoplastic olefin resin composition according to claim 19, wherein the unsaturated carboxylic acid or derivative thereof grafted is maleic anhydride, and the unsaturated aromatic monomer grafted is styrene.

21. A thermoplastic olefin resin composition according to claim 18, wherein the polyglutarimide (Component E) contains in the molecule at least 5% by weight of cyclic imide structural units represented by the formula:

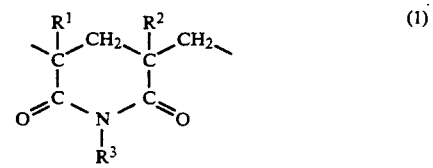

wherein each of $R^1$, $R^2$ and $R^3$ is a hydrogen atom or an aliphatic, aromatic or alicyclic hydrocarbon group having 1 to 20 carbon atoms.

22. A thermoplastic olefin resin composition according to claim 18, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

23. A thermoplastic olefin resin composition comprising 100 parts by weight of a resin composition (Component F') consisting of 1 to 99% by weight of Component D' and 99 to 1% by weight of a polyglutarimide (Component E);

0.1 to 300 parts by weight of an epoxy group containing copolymer (Component G); and up to 5 parts by weight of a basic compound (Component J);

wherein Component D' is at least one member selected from the group consisting of:

Component A', which is a modified polypropylene composition in which an unsaturated carboxylic acid or a derivative thereof is graft copolymerized onto a mixture of a polypropylene and a rubber-like material;

Component B', which is a modified polypropylene composition in which an unsaturated carboxylic acid or a derivative thereof and an unsaturated aromatic monomer are graft copolymerized onto a mixture of a polypropylene and a rubber-like material;

a mixture of Component A' and a polypropylene; and a mixture of Component B' and a polypropylene.

24. A thermoplastic olefin resin composition according to claim 23, wherein Component D' is at least one member selected from the group consisting of Component B' and a mixture of Component B' and a polypropylene.

25. A thermoplastic olefin resin composition according to claim 29, wherein the unsaturated carboxylic acid or derivative thereof grafted is maleic anhydride, and the unsaturated aromatic monomer grafted is styrene.

26. A thermoplastic olefin resin composition according to claim 23, wherein the polyglutarimide (Component E) contains in the molecule at least 5% by weight of cyclic imide structural units represented by the formula:

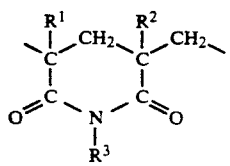
(1)

wherein each of $R^1$, $R^2$ and $R^3$ is a hydrogen atom or an aliphatic, aromatic or alicyclic hydrocarbon group having 1 to 20 carbon atoms.

27. A thermoplastic olefin resin composition according to claim 23, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

28. A thermoplastic olefin resin composition according to claim 23, wherein the rubber-like material is an ethylenic copolymer rubber.

29. A thermoplastic olefin resin composition comprising 100 parts by weight of a resin composition (Component F) consisting of 1 to 99% by weight of Component D and 99 to 1% by weight of a polyglutarimide (Component E);

0.1 to 300 parts by weight of an epoxy group containing copolymer (Component G);

0.1 to 300 parts by weight of a rubber-like material (Component H) and/or a modified rubber-like material (Component I) in which one compound or a combination of compounds selected from the group consisting of an unsaturated carboxylic acid, a derivative of an unsaturated carboxylic acid, an unsaturated carboxylic acid and an unsaturated aromatic monomer and a derivative of an unsaturated carboxylic acid and an unsaturated aromatic monomer, is graft copolymerized onto Component H; and up to 5 parts by weight of a basic component (Component J);

wherein Component D is at least one member selected from the group consisting of:

Component A, which is a modified polypropylene in which an unsaturated carboxylic acid or a derivative thereof is graft copolymerized onto a polypropylene, Component B, which is a modified polypropylene in which an unsaturated carboxylic acid or a derivative thereof and an unsaturated aromatic monomer are graft copolymerized onto a polypropylene;

a mixture of Component A and a polypropylene; and a mixture of Component B and a polypropylene.

30. A thermoplastic olefin resin composition according to claim 29, wherein Component D is at least one member selected from the group consisting of Component B and a mixture of Component B and a polypropylene; and Component I is a modified rubber-like material in which an unsaturated carboxylic acid or a derivative thereof and an unsaturated aromatic monomer are graft copolymerized onto Component H.

31. A thermoplastic olefin resin composition according to claim 30, wherein the unsaturated carboxylic acid or derivative thereof grafted is maleic anhydride, and the unsaturated aromatic monomer grafted is styrene.

32. A thermoplastic olefin resin composition according to claim 29, wherein the polyglutarimide (Component E) contains in the molecule at least 5% by weight of cyclic imide structural units represented by the formula:

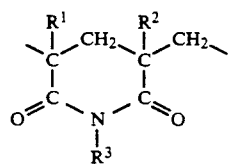
(1)

wherein each of $R^1$, $R^2$ and $R^3$ is a hydrogen atom or an aliphatic, aromatic or alicyclic hydrocarbon group having 1 to 20 carbon atoms.

33. A thermoplastic olefin resin composition according to claim 29, wherein the epoxy group containing copolymer (Component G) is a copolymer of an unsaturated epoxy compound and ethylene, or a terpolymer of an unsaturated epoxy compound, ethylene and an ethylenic unsaturated compound other than ethylene.

34. A thermoplastic olefin resin composition according to claim 29, wherein the rubber-like material (H) or the starting rubber-like material for the modified rubber-like material (I), or both, are ethylenic copolymer rubbers.

* * * * *